(12) United States Patent  (10) Patent No.: US 8,285,454 B2
Norton  (45) Date of Patent: Oct. 9, 2012

(54) VEHICLE OCCUPANT PRESENCE AND POSITION SENSING SYSTEM

(76) Inventor: Peter Norton, Farmington, MI (US)

( * ) Notice: Subject to any disclaimer, the term of this patent is extended or adjusted under 35 U.S.C. 154(b) by 201 days.

(21) Appl. No.: 12/475,497

(22) Filed: May 30, 2009

(65) Prior Publication Data

US 2009/0292423 A1  Nov. 26, 2009

Related U.S. Application Data

(63) Continuation of application No. 11/266,091, filed on Nov. 2, 2005, now Pat. No. 7,542,836, which is a continuation-in-part of application No. 10/602,031, filed on Jun. 23, 2003, now Pat. No. 6,968,263, which is a continuation-in-part of application No. 09/911,251, filed on Jul. 23, 2001, now Pat. No. 6,584,387, which is a continuation-in-part of application No. 09/218,231, filed on Dec. 22, 1998, now Pat. No. 6,292,727, which is a continuation-in-part of application No. 08/660,834, filed on Jun. 10, 1996, now abandoned, which is a continuation of application No. 08/359,947, filed on Dec. 20, 1994, now abandoned, which is a continuation of application No. 08/157,380, filed on Nov. 23, 1993, now abandoned.

(51) Int. Cl.
*B60R 21/16* (2006.01)

(52) U.S. Cl. .......................................... 701/45

(58) Field of Classification Search .............. 701/45–47; 280/728.1, 734–735; 180/268–271; 340/425.5, 340/438
See application file for complete search history.

(56) References Cited

U.S. PATENT DOCUMENTS

| | | | |
|---|---|---|---|
| 3,740,567 A | 6/1973 | Atkins | |
| 3,898,472 A | 8/1975 | Long | |
| 3,912,939 A | 10/1975 | Quantz et al. | |
| 3,943,376 A | 3/1976 | Long | |
| 4,638,982 A | 1/1987 | Misher et al. | |
| 4,767,940 A | 8/1988 | Tuttle | |
| 4,796,013 A | 1/1989 | Yasuda et al. | |
| 4,852,934 A | 8/1989 | Yasuda et al. | |
| 4,855,566 A | 8/1989 | Hays et al. | |
| 4,881,456 A | 11/1989 | Yasuda et al. | |
| 4,887,024 A | 12/1989 | Sugiyama et al. | |
| 5,071,160 A | 12/1991 | White et al. | |
| 5,074,583 A | 12/1991 | Fujita et al. | |
| 5,186,494 A | 2/1993 | Shimose | |
| 5,205,582 A | 4/1993 | Shiga et al. | |
| 5,232,243 A | 8/1993 | Blackburn et al. | |
| 5,256,904 A | 10/1993 | Tohbaru | |

(Continued)

FOREIGN PATENT DOCUMENTS

DE  4110936  10/1992

(Continued)

*Primary Examiner* — Yonel Beaulieu

(74) *Attorney, Agent, or Firm* — Clay McGurk; The Law Office of Clay McGurk

(57) ABSTRACT

Sensors in a vehicle seat provide data for classifying occupants. Information from the sensors may be used to determine the position of an occupant relative to the seat and relative to the vehicle, the weight of the occupant, whether the seat belt is latched, and the position of the occupant relative to an airbag before and during a crash. Situations wherein airbag deployment is not desired are identified. A particularly inexpensive system meets the occupant classification needs of a system comprising a low risk deployment passenger airbag.

16 Claims, 4 Drawing Sheets

U.S. PATENT DOCUMENTS

| | | |
|---|---|---|
| 5,330,226 A | 7/1994 | Gentry et al. |
| 5,404,128 A | 4/1995 | Ogino et al. |
| 5,411,289 A | 5/1995 | Smith et al. |
| 5,466,001 A | 11/1995 | Gotomyo et al. |
| 5,525,843 A | 6/1996 | Howing |
| 5,570,903 A | 11/1996 | Meister et al. |
| 5,948,031 A | 9/1999 | Jinno et al. |
| 5,964,478 A | 10/1999 | Stanley et al. |
| 6,043,743 A | 3/2000 | Saito et al. |
| 6,356,187 B2 | 3/2002 | Jinno et al. |
| 6,442,464 B2 * | 8/2002 | Eisenmann et al. ............ 701/45 |
| 2002/0120379 A1 * | 8/2002 | Oestreicher et al. ............ 701/45 |

FOREIGN PATENT DOCUMENTS

| | | |
|---|---|---|
| JP | 64-22654 | 1/1989 |
| JP | 63-35205 | 2/1998 |

* cited by examiner

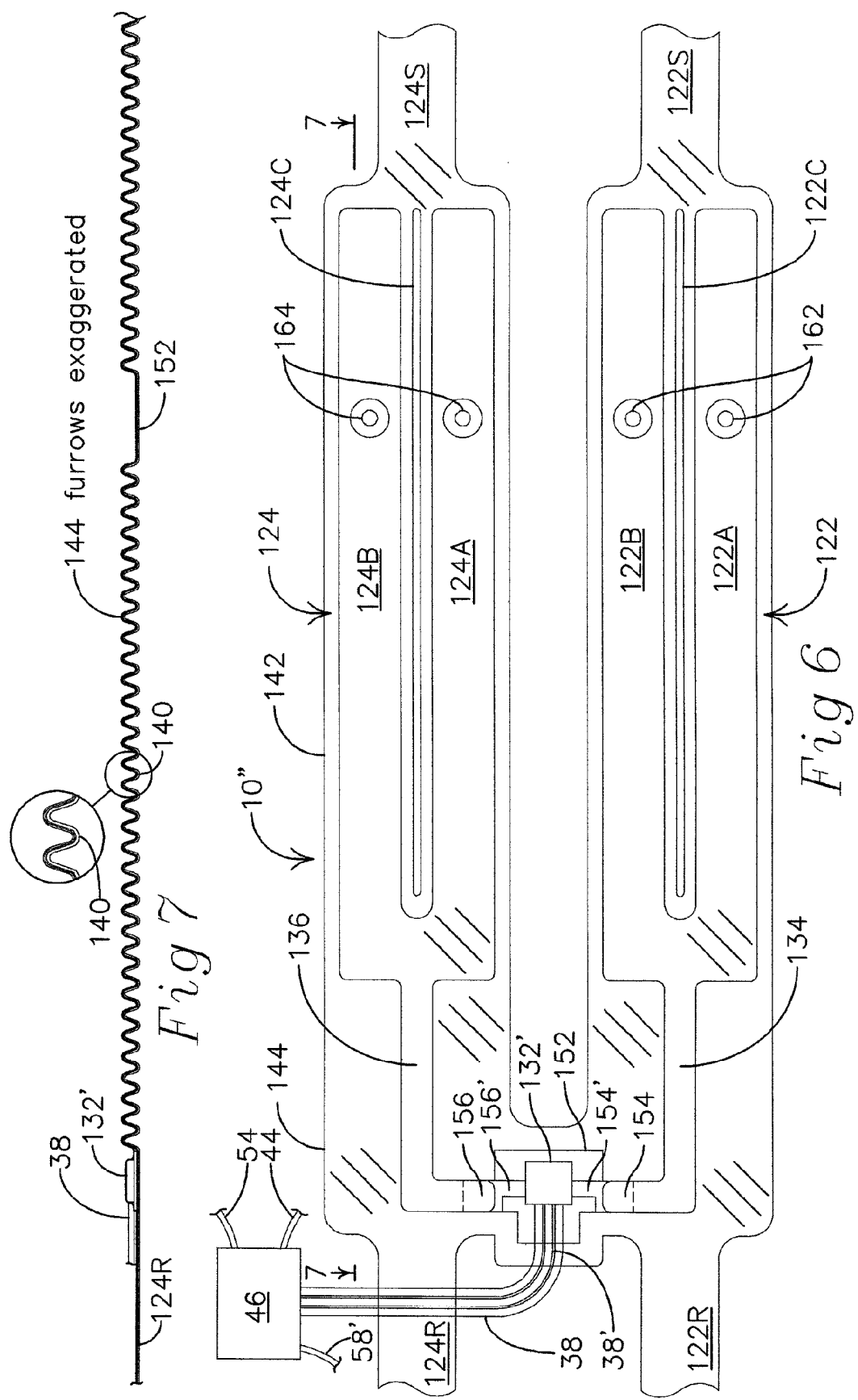

VEHICLE OCCUPANT PRESENCE AND POSITION SENSING SYSTEM

This application is a continuation of application Ser. No. 11/266,091 filed Nov. 2, 2005 for "Vehicle Occupant Presence and Position Sensing System", now U.S. Pat. No. 7,542,836 which is a continuation-in-part of application Ser. No. 10/602,031 filed Jun. 23, 2003 for "Vehicle Occupant Presence and Position Sensing System", now matured into U.S. Pat. No. 6,968,263, which is a continuation-in-part of application Ser. No. 09/911,251 filed Jul. 23, 2001 for "Vehicle Occupant Presence and Position Sensing System", now U.S. Pat. No. 6,584,387 now expired, which is a continuation-in-part of application Ser. No. 09/218,231 filed Dec. 22, 1998 for "Vehicle Occupant Presence and Position Sensing System", now matured into U.S. Pat. No. 6,292,727, which is a continuation-in-part of application Ser. No. 08/660,834 filed Jun. 10, 1996 for "Occupant Position Sensing System", now abandoned, which is a continuation of application Ser. No. 08/359,947 filed Dec. 20, 1994 for "Occupant Position Sensing System", now abandoned, which is a continuation of application Ser. No. 08/157,380 filed Nov. 23, 1993 for "Occupant Sensing System", now abandoned.

FIELD OF THE INVENTION

This invention relates to systems for determining if a vehicle seat is occupied by a person and, if so, insuring that the air bag will protect the person during a collision as well as possible.

BACKGROUND OF THE INVENTION

An air bag comprises an inflatable bag and means for inflating the bag. Air bags are highly desired life saving devices that have performed well in many accidents and saved many lives. However, the bag must be inflated in a very brief time such as $1/30$ of a second that requires rapid movement of the bag from a stored and compacted state to a fully inflated state. The rapid deployment of the bag involves great force. A deploying bag, if it is not a low risk deployment airbag, can injure a person during the early phases of deployment if the person is very close to where the airbag is stored. Deployment is not desired when the occupant is an infant human in a rear-facing infant seat. It is also desired to inhibit deployment if there is no person in the seat. Much effort has gone into developing systems for characterizing the occupant and ascertaining the occupant position to meet this need. Proposed systems attempt to ascertain the distance from the inflator to the seat occupant and systems using sonic and optical ranging for that purpose are well known. These systems are deficient in that they cannot reliably distinguish between an occupant and other things such as road maps, beverage cups, packages and voluminous clothing that cause indications that the occupant is near the inflator. Certain prior art systems operate to measure the distance from the inflator to the occupant, presumably because that is the physical variable most easily related to the potential for injury.

Many vehicles include an accelerometer located in the passenger compartment for sensing the deceleration of a crash. These accelerometers are incorporated in sensing and diagnostic modules or "SDMs", which are decision making centers for the vehicle occupant protection system that control devices such as dashboard indicators, airbags, and belt pretensioners. The output of the accelerometer may be integrated by an analog circuit or a microprocessor in the SDM to compute a difference between the velocity the vehicle was traveling before a crash and the velocity of the passenger compartment during the crash. The integral of the accelerometer output may be integrated again to obtain the second integral of the deceleration, which is the displacement of a free body from its initial position relative to the vehicle. An occupant not wearing a seat belt is, to a good approximation, a free body. Therefore, the second integral is the distance an unbelted occupant has moved from his or her initial position at any time during the crash. Vehicles typically include seat belt latched sensors for indicating if seat belts are latched.

Ultrasonic distance measurement based on measuring a time period beginning when sound is generated by a sound emitter and ending when an echo from a object at the distance to be measured is received by a receiver located at a point near the sound emitter is well known and has been used for many years in such as focusing systems for cameras. Using ultrasonic distance measurement to measure the distance from the back of a vehicle seat to the back of a seat occupant works well at distances that provide time for vibrations excited during the sound creation to subside and leave a receiver at the sound source responsive to low intensity sound.

Position and angle sensors are in commercial production for sensing the position of a seat on its track and the angle the seat back is reclined.

Capacitive proximity sensors have been well known for many years and have many successful applications. In addition to measuring capacitance, the Q of the capacitance may be measured to provide additional information about the nature of the material being detected. Some materials including materials containing water tend to significantly reduce the Q of the sensed capacitance.

Ignoring the self inductance of the lead wires, a capacitor is conventionally viewed as a pure capacitance C having capacitive reactance $X_C$ which is a measure of opposition to flow of an alternating current of frequency f given by $$X_C = \frac{1}{2 \cdot \pi \cdot f \cdot C}$$

in series with an energy dissipating resistance $R_C$ and the combination has an impedance $$Z = \sqrt{R_C^2 + X_C^2}$$

In certain capacitors there is a resistance in parallel with the capacitor. A well known example is electrolytic capacitors that have significant series resistance and may have significant leakage through the electrolyte. In automobile seat occupant sensors steps are taken to insulate the capacitor electrodes to prevent leakage across the capacitor. Therefore, a model comprising a zero loss capacitance C in series with an energy dissipating resistance $R_C$ is believed to be most like actual seat occupant sensing systems.

The Power Factor (PF) is defined as the ratio of the effective series resistance $R_C$ to the impedance Z and is usually expressed as a percentage.

The Dissipation Factor (DF) is the ratio of the effective series resistance $R_C$ to capacitive reactance $X_C$ and is usually expressed as a percentage. The DF and PF are essentially equal when the PF is 10 percent or less.

The Quality Factor (Q) is a figure of merit and is the reciprocal of the dissipation factor DF; $Q = X_C/R_C$.

Circuits for measuring capacitance of a capacitor are well known and are incorporated in many commercially available measuring instruments and are implemented on unitary silicon semiconductor chips by several makers.

The concept of the impedance of a capacitor leads to measuring the capacitance of a capacitor by applying an alternating current voltage to the capacitor and measuring the displacement current through the capacitor. The impedance Z is equal to the applied voltage V divided by the displacement current $I_D$; $Z=V/I_D$. The current leads the voltage by a phase angle (phi).

If the Q of the capacitor is large, $R_C$ can be ignored, Z and $X_C$ are approximately equal, and the capacitance is obtained directly from the displacement current $I_D$ and the frequency f and voltage V of the applied alternating current $$C = \frac{I_D}{2 \cdot \pi \cdot f \cdot V}$$

For smaller Q or greater precision, the capacitive reactance $X_C$, the equivalent resistance $R_C$, and the capacitance C are calculated from:

$$X_C = Z \cdot \sin(phi)$$
$$R_C = Z \cdot \cos(phi)$$
$$C = \frac{1}{2 \cdot \pi \cdot f \cdot X_C}$$

Page 322 of the book *Electrical Instruments and Measurements* by Walter Kidwell and published in 1969 by McGraw-Hill, Inc. states that "Capacitance can be measured in a number of ways". It further states "Generally, there are two practical ways of measuring capacitance:"

"1. Absolute measurements in terms of other electrical units."

"2. Comparison methods, where the unknown capacitor is compared with a known standard that has been previously calibrated."

"Bridge methods are in the latter category, and it is to these methods that we shall confine our discussion on the following pages."

The aforementioned book by Walter Kidwell then proceeds to illustrate a Wien Bridge", a "Generalized capacitance bridge", a "Five terminal bridge network", a simplified method of connecting a three terminal network, a "Schering bridge", a "shielded Schering bridge", and a bridge having a "Wagner ground".

All of the capacitance bridges share the common feature of presenting an alternating current signal to the series combination of an unknown capacitor and a first known element(s) of the bridge. Other elements of the bridge with known properties form a second voltage divider producing a signal for comparison with the signal at the junction between the unknown capacitor and the first known element of the bridge. When the bridge is balanced, the amplitudes and phases of currents in all of the elements of the bridge can be calculated relative to the amplitude and phase of the alternating current signal. Therefore, the illustrated capacitance bridges operate by a process that determines the amplitude and phase shift of the current in the capacitor being tested.

The following illustrates, by using the examples of the Wien bridge and the Schering bridge, cases of capacitance measurement accomplished by applying a signal to one electrode of a capacitor and observing the signal at the other electrode of the capacitor.

FIG. 3 illustrates a Wien bridge. It is taken from FIG. 10-15 of the aforementioned book *Electrical Instruments and Measurements*. Pages 322 through 329 of this book discuss measuring capacitance. In FIG. 3 the parallel combination of $C_d$ and $R_d$ represent respectively the energy conserving and energy dissipating properties of the capacitance to be measured. In FIG. 3 signal generator 212 provides a signal to electrode 214 of the unknown capacitor $C_d$. The signal at electrode 216 of the unknown capacitor represented by the parallel combination of $C_d$ and $R_d$ is observed and compared with a comparison signal provided by the resistors $R_a$ and $R_b$ by such as the illustrated headphones. The components $R_c$ and $C_c$ are varied to achieve a balance wherein there is no signal across the headphones 218. Peculiar to the Wien bridge, the energy conserving property $C_d$ of the unknown capacitance can be determined from the frequency of the signal from the signal generator and the values of the resistors in the bridge without knowing the capacitance of the adjustable capacitor.

When the Wien bridge of FIG. 3 is balanced as indicated by no signal at headphones 218 the displacement current through the unknown capacitor represented by the capacitance $C_d$ in parallel with resistance $R_d$ is equal to the displacement current through the variable capacitor $C_c$. Both the magnitude and the phase of the displacement current $I_D$ through the variable capacitor $C_C$ can be determined by the following process. The voltage across the series combination of $C_C$ and $R_C$ is equal to the voltage E from signal generator 212 times the ratio $R_b/(R_a+R_b)$. The current in the right side of the bridge is equal to the voltage across the series combination of $C_C$ and $R_C$ divided by the impedance of the series combination of $C_C$ and $R_C$ where $X_{Cc}$ is computed from $X_{Cc}=1/(2 \cdot \pi \cdot f \cdot C_C)$. Accordingly, the displacement current and its phase are given by $$I_D = \frac{E \cdot R_b}{(R_a + R_b) \cdot \sqrt{R_c^2 + X_{Cc}^2}}$$

$$phi = \tan^{-1} \sqrt{\frac{R_c^2 + X_{Cc}^2}{R_c}}$$

The displacement current through the capacitor being tested (represented by the parallel combination of $C_d$ and $R_d$) is $I_D$ and the phase shift is phi because the two right legs of the bridge carry the same current. The voltage $E_d$ across the capacitor being tested is the voltage E from signal generator 212 times the ratio $R_d/(R_a+R_b)$;

$$E_d = \frac{E \cdot R_a}{R_a + R_b}$$

With the voltage $E_d$, current $I_D$, and phase shift phi across the capacitor being tested known, the impedance $Z_c$ can be calculated from the formula $Z_c$=resistance $R_C$ times the ratio $R_d/R_b$. As described hereinabove, the capacitive reactance $X_{Cc}$, the equivalent resistance $R_{Cc}$, and the capacitance $C_C$ are calculated from $$X_{Cc} = Z_c \cdot \sin(phi)$$
$$R_{Cc} = Z_c \cdot \cos(phi)$$

$$C_c = \frac{1}{2 \cdot \pi \cdot f \cdot X_{Cc}}$$

The Quality Factor (Q) is calculated from $Q_c = X_{Cc}/R_{Cc}$.

FIG. 4 illustrates a Schering bridge. It is taken from FIG. 10-19 of the aforementioned book *Electrical Instruments and Measurements*. $C_2$, illustrated in FIG. 4, is an unknown capacitor that may have qualities that cause energy loss. In FIG. 4 signal generator 312 provides a signal to electrode 314 of capacitor $C_2$. The signal at electrode 316 of capacitor $C_2$ is observed and compared with a comparison signal provided by capacitor $C_1$ in series with the parallel combination of capacitor $C_4$ and resistor $R_4$ by such as the illustrated galvanometer 318. The components $C_4$ and $R_4$ are varied to achieve a balance wherein there is no signal across the galvanometer 318.

When the Schering bridge of FIG. 3 is balanced as indicated by no signal at or current through galvanometer 318 the displacement current through the unknown capacitor represented by the capacitance $C_2$ is equal to the current through the resistor $R_3$. The phase shift of the current in the circuit including unknown capacitor $C_2$ is the same as the phase shift in the left leg of the bridge. Both the magnitude and the phase of the displacement current $I_4$ through the fixed capacitor $C_1$, and therefore the voltage across capacitor $C_1$ can be determined by application of elementary circuit theory to the parallel combination of variable resistor $R_4$ and variable capacitor $C_4$ in series with capacitor $C_1$. The voltage across unknown capacitor $C_2$ is equal to the voltage across capacitor $C_1$. The displacement current $I_2$ through unknown capacitor $C_2$ is calculated from $I_2 = E_{R3}/R_3$ where $E_{R3}$ is the voltage across resistor $R_3$, which is known because it is the same as the voltage across the parallel combination of variable resistor $R_4$ and variable capacitor $C_4$, which was determined from elementary circuit theory.

With the voltage $E_2$, current $I_2$, and phase shift phi across the capacitor $C_2$ known, the impedance $Z_{right}$ of the right leg of the bridge is calculated from $Z_{right}$=the voltage E from signal generator 312 divided by the current $I_2$. As described hereinabove the capacitive reactance $X_{C2}$, the equivalent resistance $R_{C2}$, and the capacitance $C_2$ are calculated from $$X_{C2} = Z_{right} \cdot \sin(phi)$$
$$R_{C2} = Z_{right} \cdot \cos(phi) - R_3$$
$$C_2 = \frac{1}{2 \cdot \pi \cdot f \cdot X_{C2}}$$

The Quality Factor (Q) is calculated from $Q_2 = X_{C2}/R_{C2}$.

The two cases described in detail above illustrate that the process of measuring the capacitance and Q of a capacitor conventionally involves measuring the displacement current and the phase shift of the displacement current through the capacitor when a known alternating current signal is applied.

The features common to the Wien bridge and the Schering bridge are that an alternating current signal generator is connected to the series combination of the unknown capacitor and a known impedance. By balancing the bridge, the displacement current and phase shift of the displacement current in the unknown capacitor are determined from which the parameters of the unknown capacitor are calculated.

A circuit for measuring Q is significantly more expensive to make than a circuit that measures only capacitance. Therefore, it is desired to measure only capacitance and not Q if acceptable performance can be achieved.

Certain vehicles in volume production include a fluid filled bladder placed under a seat cushion whereby the downward force of a seat occupant pressurizes the fluid and the pressure in the fluid is measured. Other sensors and mechanisms for determining seat occupant weight are in volume production.

Certain airbags, known as low risk deployment airbags, are designed to minimizes the likelihood of injuring the occupant of the front seat of a vehicle by controlling the force applied to the seat occupant, which might be a child seated in the seat. However, these systems apply forces that might be injurious, particularly to a baby in a baby seat. Therefore, an occupant classification system that distinguishes between an occupant seated in the vehicle seat and an infant or child seated in an infant or child seat is needed. It is also desired after a frontal crash in which the passenger seat is empty to save the cost of replacing the passenger side airbag. Therefore detection of an empty seat is needed. Low cost is desirable.

Issued U.S. Pat. Nos. 6,292,727 and 6,584,387 and copending application Ser. No. 10/602,031 teach seat occupant sensing systems that classify the occupant of a seat into classes including the classes of empty seats, infant and child seats, and the class of adults seated in the vehicle seat. For the classes of infants in infant seats and empty seats these systems may give similar indications.

It is desired to protect capacitor electrodes in a car seat from fluids because the fluids may be corrosive to the electrically conducting material of the capacitor electrode and for other reasons. For this purpose U.S. Pat. No. 6,906,534 published Jun. 14, 2005 describes enclosing capacitor electrodes in a breathable polymeric material that is impervious to liquid water.

Capacitive seat occupant sensing systems that place all of the capacitor electrodes in the seat cushion and none in the seat back are particularly affected by dampness. The fabric at the surface of the seat may absorb water as may fabric underneath the exposed fabric. Water makes these materials electrically conductive, which results in short circuiting the electric fields formed by the capacitor electrodes. When one capacitor electrode is in the seat back and one capacitor electrode is in the seat cushion the electrical isolation of the seat back fabric from the seat cushion fabric operates against such short circuiting.

Known systems classify occupants using only capacitor electrodes in the seat cushion. For this purpose additional electrodes are included, including capacitor electrodes on the underside of the seat foam and electrodes driven by signals matching the signal applied to the capacitor electrodes to hide capacitances irrelevant to the occupancy of the seat. The aforementioned U.S. Pat. No. 6,906,534 issued Jun. 14, 2005 suggests the need for humidity sensors, possibly both at the electrodes in the seat and elsewhere in the vehicle to provide data that enables a microprocessor to calculate compensation for the moistness of the seat fabric. The aforementioned U.S. Pat. No. 6,906,534 teaches using a breathable moisture barrier for enclosing flexible electrodes, foam substrate and other components, specifically humidity sensors, within a substantially liquid impervious environment without impairing the ability of electrical sensors to accurately measure temperature and humidity in the seating compartment of an automobile.

Herein "capacitor electrode" is defined to describe a body comprising electrically conductive material extending in two dimensions thereby having a surface at which an electric field will originate or terminate if there is surplus or deficiency respectively of electric charge in the electrically conductive material. A capacitor electrode may comprise a single body of electrically conductive material or may comprise multiple bodies of electrically conductive material connected to enable electric charge to flow therebetween.

Herein the term "electric current" is defined to be coherent movement of electric charges within an electric conductor.

Herein the term "displacement current" is defined to be the apparent flow of electricity in such as a capacitor wherein an electric insulator blocks electric charges from flowing and the apparent flow results from changes in accumulations of electric charges proximate to the electric insulator.

Herein a "seat cushion" is defined to be the usually resilient part of a seat that contacts the thighs of a seated person as distinct from the part of a seat that contacts the back of a normally seated person.

Herein a "seat back" is defined to be the part of a seat that contacts the back of a normally seated person.

The preceding definitions are believed to be statements of the conventional definitions used by those skilled in the arts of vehicle seating and of capacitive sensing and are included to preclude conflicting interpretations.

A general object of the invention is to provide means responsive to a seat occupant by indicating a classification of said occupant and methods for using said indication, which also overcomes certain disadvantages of the prior art.

SUMMARY OF THE INVENTION

The present invention provides means for classifying seat occupants. The classes may be such as the class of children in child seats, the class of adult persons, and the class of cargo. If the occupant is an adult person, there may be classes related to features of the person and locations of the person.

Further, in accordance with certain preferred embodiments of the invention, capacitor electrodes and means responsive to the capacitance between the capacitor electrodes are provided to classify and determine the position of an occupant, the system being highly reliable and economical to manufacture.

Further, in accordance with certain preferred embodiments of the invention, a first capacitor electrode is located in the seat back of a vehicle seat and a second capacitor electrode is located in the seat cushion of a vehicle seat.

Further, in accordance with certain preferred embodiments of the invention, the position of a person in a seat is determined from the distance from the back of the seat to the back of the person. This is preferable to ascertaining the position of a person by measuring the position of the front of the person because it is unusual for there to be objects likely to affect capacitance between the back of the seat and the back of the person whereas a person is likely to place objects in front of himself or herself that confuse known systems based on reflected sound or light.

Further, in accordance with certain preferred embodiments of the invention, the distance from the back of the seat to the back of the seat occupant is calculated from the capacitance between a capacitor electrode in the seat cushion and a capacitor electrode in the seat back when the distance from the back of the seat to the back of the occupant is small and can be accurately measured by capacitance sensing and ultrasonic or radar distance sensors may function poorly.

Further, in accordance with certain preferred embodiments of the invention, at intermediate distances from the back of the seat to the back of the seat occupant, two measuring systems are operable. There is a sensor suitable for measuring larger distances and a capacitance based distance sensing system used to calibrate and validate the distance sensor suitable for measuring larger distances. This enables detection of and possible compensation for factors such as a thick outer coat or a pad placed over the seat back, which may lead to inaccurate measurement or errors by an ultrasonic distance sensor or a radar distance sensor.

Further, in accordance with certain embodiments of the invention, when the back of the seat occupant is located at large distances from the seat back that make distance calculated from capacitance inaccurate, the distance is measured by a means suitable for measuring large distance such as ultrasonic ranging or radar.

Further, in accordance with certain preferred embodiments of the invention, a second pair of capacitor electrodes and second capacitance sensing means enable calculating a second value at a lower height, of the distance from the seat back to the back of the seat occupant. The first and second measurements together define a line in contact with the back of the seat occupant that defines a plane transverse to the travel direction of the vehicle that defines the position of the back of the seat occupant.

Further, in accordance with certain preferred embodiments of the invention, the second measurement at a lower height enables additional determinations such as if the lap belt but not the shoulder belt is functioning.

Further, in accordance with certain preferred embodiments of the invention, a highly advantageous seat occupant presence and position sensing system is provided because, by ascertaining if a seat is occupied by a normally seated person or is vacant other important occupant classifications such as a child in a forward or a rearward facing child seat are also identified.

Further, in accordance with certain embodiments of the invention, occupants that have moved into positions where airbag deployment might be dangerous are detected. An occupant reaching forward to place or retrieve something on the dash may be dangerously close to the inflator for a short time. By determining that the back of the occupant is located at a position suggesting a deploying airbag might injure the occupant, the invention enables the air bag to be disabled or deployed to a lower level to eliminate the risk of injury. Being voluntarily out of position is distinguished from the occupant being close to the airbag door during an accident, which is likely to happen if the seat belt is not in use or is being used incorrectly. The movement of the seat occupant during a crash when the seat belt is not fastened is predicted by doubly integrating the vehicle deceleration and adding the integral and a term resulting from the forward velocity of the occupant when the crash begins to accurately compute the movement of the seat occupant from the position before the crash to positions reached as the crash progresses.

Further, in accordance with certain embodiments of the invention, a weight sensor may be provided for measuring the weight of the seat occupant. This enables more accurately estimating the distance from the back of the occupant to the front of the chest by assuming the occupant is a person having average dimensions for a person of the measured weight.

Further, in accordance with certain embodiments of the invention, a cushion based seat occupant weight sensor is provided in combination with a capacitance based seat occupant sensor. Cushion based seat occupant sensors are less responsive to the weight of a seat occupant in a seat with a reclined seat back than they are to the weight of the same occupant when the seat back is upright. A child sitting upright or leaning forward which causes the full weight of the child to be detected by a cushion based system is distinguished by the capacitance sensor of the invention from an adult seated with a reclined seat back wherein a cushion based system might detect only a fraction such as one half of the weight of the adult.

Further, in accordance with certain embodiments of the invention, information is provided that prevents airbag deployment when deployment would be dangerous to an occupant. For example, a person stretching forward and upward to view the road may be vulnerable to injury by a rearward deploying air bag. A forward leaning occupant is detected either as out-of-position by sensing the large distance from the back of the seat or is not detected. In both cases the desired action is taken, which is that the airbag deployment is prevented or is of lower power.

Further, in accordance with certain embodiments of the invention, the occupant presence and position sensing system of the invention measures the distance the occupant is leaning forward from the normal position against the seat back. This determines an upper torso position relative to the seat back if the assumption is made that the lower back of the occupant is at the surface of the seat back. The position of the occupant relative to the seat back is combined with the position of the seat cushion and back calculated from the seat track position and the seat back recline angle to determine the position of the occupant's back relative to the vehicle structure. An average value may be used for the distance from the back to the front of the occupant. If a weight sensor is present an average chest thickness for a person of the measured weight is used. The position of the front of the occupant is preferably used to calculate the distance from the occupant to the airbag. This information is used to prevent air bag deployment when the seat occupant is positioned where deployment would be dangerous.

Further, in accordance with certain embodiments of the invention, the occupant presence and position sensing system of the invention measures the distance the occupant has moved forward during a crash from the normal position against the seat back. A second capacitor electrode at a lower height and a second capacitance sensor enable calculating the distance from the lower back of the occupant to the surface of the seat back at a lower height. The two points determine a straight line in contact with the back of the seat occupant. The position of the seat back calculated from the seat track position and the seat back recline angle is combined with the occupant position relative to the seat to determine the position of the occupant relative to the airbag. This information is used to prevent air bag deployment when the seat occupant is likely to be in a position where deployment would be dangerous.

Further, in accordance with certain embodiments of the invention, the capacitive presence and position sensing system may also measure the Q of the capacitances being sensed to thereby ascertain additional information about the occupant of the seat.

Further, in accordance with certain embodiments of the invention, certain seat occupation classes are each represented by distinct ovals in the Q-log C plane thereby providing a simple method for interpreting a measurement of capacitance and Q.

Further, in accordance with certain embodiments of the invention, the occupant presence and position sensor of the invention continuously determines the position of the seat occupant relative to the seat. The position of the seat occupant relative to the seat is communicated to a microprocessor, which combines the occupant position with the position of the seat determined from the seat track and recline measurements to continuously make available the position of the occupant relative to the structure of the vehicle.

Further, in accordance with certain embodiments of the invention, during a collision an initial position and velocity of the seat occupant relative to the structure of the vehicle is combined with the second integral of the acceleration measured by the accelerometer in the SDM to determine the position of an unbelted seat occupant relative to the vehicle interior as the crash progresses. The occupant position is estimated to be the initial position adjusted forward by the amount of the second integral. This position determination is useful if only the lap belt engages the occupant and only the head and upper torso move forward according to the second integral while the motion of the entire torso resembles rotation about the seat belt.

Further, in accordance with certain embodiments of the invention, differences in seat occupant position may be taken at periodic times to ascertain any forward velocity the occupant might have with respect to the seat. During a collision, the velocity most recently determined times the time since the position was last determined is added to the second integral of the deceleration to obtain an estimate of the current position of the seat occupant.

Further, in accordance with certain embodiments of the invention a particularly low cost seat occupant sensor distinguishes between a person seated in a vehicle seat and an infant or child in an infant or child seat located on the vehicle seat. These embodiments are particularly advantageous for use with those low risk deployment airbags that do not threaten injury except to infants or children in infant or child seats.

Further, in accordance with certain embodiments of the aforementioned particularly low cost seat occupant sensor, a pair of parallel, capacitor electrodes, offset from each other in the vehicle's lateral direction and extending in the vehicle's forward-backward direction in close proximity to the seat upholstery fabric enables a capacitance based occupant classification system that is particularly inexpensive because it requires only capacitance and not Q to be measured.

Further, in accordance with certain embodiments of the aforementioned particularly low cost seat occupant sensor having a pair of parallel capacitor electrodes extending in the vehicle's forward-backward direction, the aforementioned sensitivity of a capacitance based seat occupant sensing system to moistness of the upholstery material and underlying materials is accommodated using just two parallel capacitor electrodes without increasing the complexity of the system with such as humidity sensors and driven plates backing up the capacitor electrodes.

The suitability of the certain embodiments of the aforementioned particularly low cost seat occupancy sensor having a pair of parallel capacitor electrodes extending in the vehicle's forward-backward direction for augmenting low risk deployment systems follows from the realization, a realization that enables a significant advance over the prior art, that sensitivity to moistness does not rule out using this particular capacitance based seat occupant sensor system for the purpose of preventing airbag deployment when the seat is empty or the seat is occupied an infant or child seat occupied by an infant or a child. On the contrary, the one failure that would rule out using this particular seat occupancy sensor would be if the system failed to recognize that the seat is occupied by an adult and inhibited airbag deployment. In this regard this particular low cost seat occupancy sensor works exactly as desired.

The systems encompassed by the preceding three paragraphs are suitable for all anticipated humidities and fabrics dampness for reasons presented in the following. At low humidity and little or no dampness the system accurately identifies all humans seated on the seat cushion and distinguishes them from all infants in infant seats. When the fabric becomes damp because of such as very high humidity or liquid spilled on the seat, the system may indicate there is an adult in the seat even if the seat is empty. This is believed to be acceptable because:

1) The "must meet" requirement of enabling deployment for an adult occupant is met;
2) Deploying an airbag when there is an infant in an infant seat or a child in a child seat is acceptable but not desired because a low risk deployment airbag must meet US Government requirements for the maximum forces the airbag applies to an infant in an infant seat. These maximum forces are set at levels that are safe for an infant or a child.
3) Identifying an empty seat as occupied is also acceptable but not desired because it might let an airbag deploy into an empty seat and thereby unnecessarily impose the cost of replacing the airbag module.

Misidentification in cases 2) and 3) is believed to be acceptable in combination with a low risk deployment airbag if it only happens when the seat is moist because the consequences are not grievous and the seat being moist and empty or the seat being moist and containing a child seat is believed to occur rarely. Therefore, the likelihood of an unwanted airbag deployment is believed to be very small and only a small number of such occurrences are likely over the lifetimes of a large number of vehicles. This is highly advantageous over the much larger number of deployments that would occur if the airbag always deployed whether or not there is a child in a child seat or the seat is empty because the cost of replacing the airbag is saved and a the number of deployments while there is a child in a child seat is best minimized.

Further, in accordance with the aforementioned particularly low cost occupant sensor having a pair of parallel capacitor electrodes extending in the vehicle's forward-backward direction, it has been found that the pair of parallel spaced apart capacitor electrodes extending in the vehicle's forward-backward direction is particularly advantageous because it minimizes sensitivity of the seat occupant sensor to the occupant's forward-backward location on the seat. The system has also been found to be minimally sensitive to small lateral occupant shifts, enabling airbag deployment to be substantially independent of where the occupant is on the seat.

Further, in accordance with the aforementioned particularly low cost seat occupant sensor having a pair of parallel capacitor electrodes extending in the vehicle's forward-backward direction, the pair of capacitor electrodes each being in close proximity to the seat upholstery fabric, in the case wherein each capacitor electrode is about one to two inches wide and the pair are spaced horizontally apart by about one to two inches, a seated human occupant causes a substantially constant capacitance for all occupant positions so long as the occupant is close to at least two or three longitudinal inches of each capacitor electrode.

Further, in accordance with the aforementioned particularly low cost occupant sensor having a pair of parallel capacitor electrodes extending in the vehicle's forward-backward direction, a preferred capacitor electrode length is greater by approximately two to four inches than the range of forward-backward occupant positions over which the system is required to be sensitive to the presence of an occupant.

Further, in accordance with the aforementioned particularly low cost occupant sensor having a pair of parallel capacitor electrodes extending in the vehicle's forward-backward direction, the capacitor electrodes are combined with a capacitance sensing circuit and the combination is sealed in a container made of plastic sheet with electric wires exiting through sealed openings in the container. The combination prevents fluid access to the capacitor electrodes and provides an inexpensive sealed package containing all electrical components of the sensing system.

Further, in accordance with certain embodiments of the aforementioned particularly low cost occupant sensor having a pair of parallel capacitor electrodes extending in the vehicles' forward-backward direction in a container made of plastic sheet, the plastic sheet is heat set into a furrowed shape whereby an inexpensive plastic that is not elastic is made into a container having elasticity that enables it to stretch with the underlying foam.

Further, in accordance with the aforementioned particularly low cost occupant sensor, a distance sensor may be additionally provided to ascertain the forward-backward position of the back of a person sitting in the seat. This combination enables a substantially guaranteed distinction between a child in a child seat and a person seated in the vehicle seat and, further, when a person is seated in the vehicle seat the proximity of the seat occupant to the airbag is ascertained from the distance from the back of the seat to the back of the occupant and other known measurements.

A complete understanding of the invention may be obtained from the description that follows taken with the accompanying drawings.

DESCRIPTION OF THE DRAWINGS

FIG. 6 shows the capacitive seat occupant sensor of FIG. 5.

FIG. 7 shows in section the capacitive seat occupant sensor of FIG. 6 taken at section 7-7 of FIG. 6.

BEST MODE FOR CARRYING OUT THE INVENTION

Figure 3:
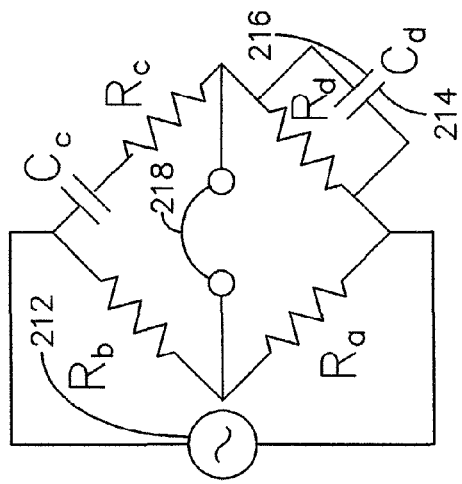
FIG. 3 shows a Wien bridge circuit for measuring capacitance.
Figure 4:
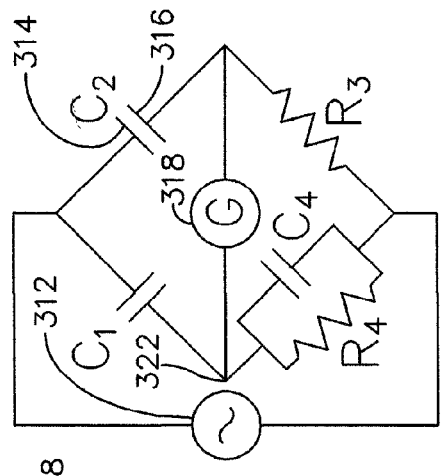
FIG. 4 shows a Schering capacitance bridge circuit.
Figure 1:
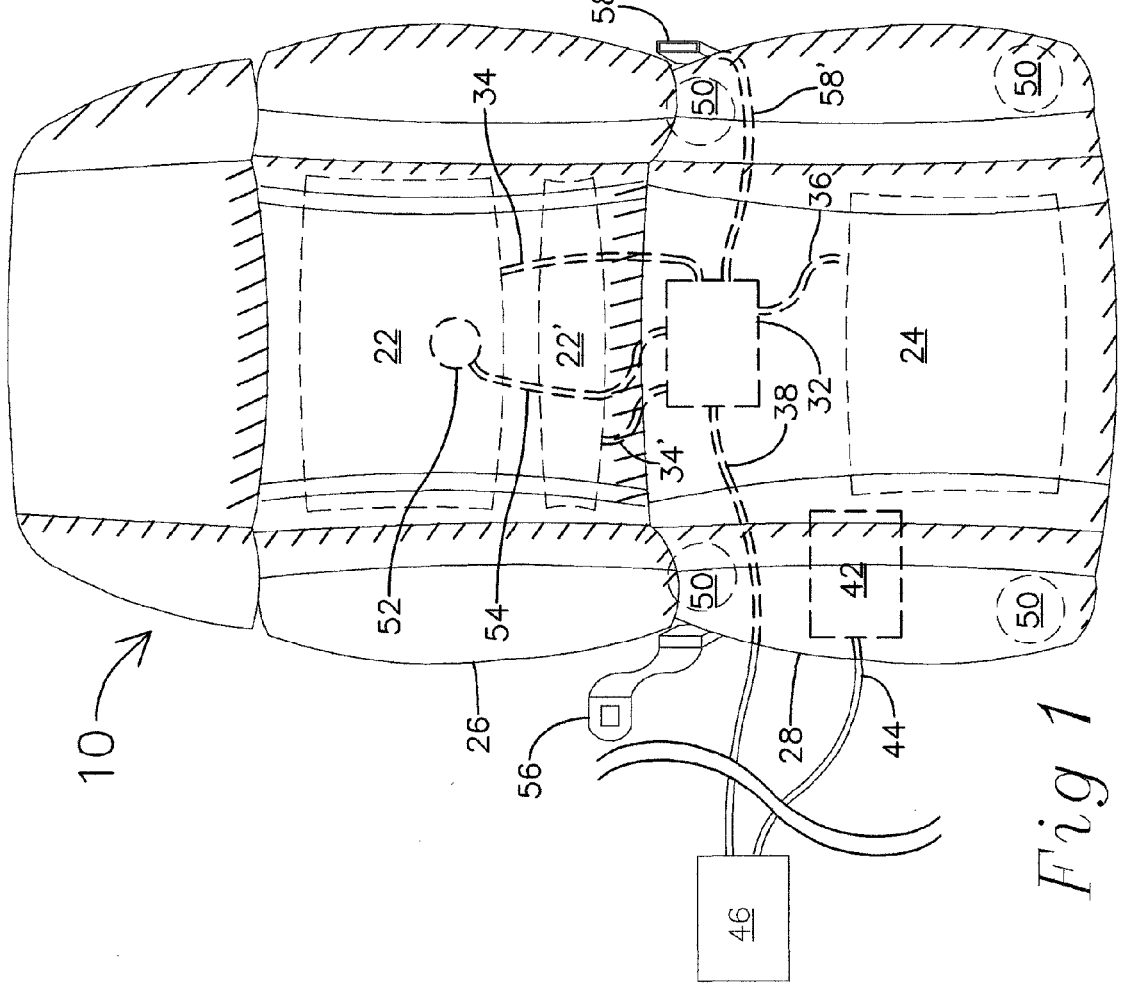
FIG. 1 shows an automobile seat and illustrates sensors for providing data from which the occupant position can be calculated.

Referring now to FIG. 1, the occupant presence and position sensing system 10 comprises two capacitor electrodes 22 and 22' located beneath the fabric of a vehicle seat back 26, and capacitor electrode 24 beneath the fabric of a vehicle seat cushion 28. Other numbers of capacitor electrodes and capacitor electrode locations may be determined by those skilled in the relevant arts. An electronic circuit 32 is connected with capacitor electrode 22 by electrical conductor 34, with capacitor electrode 22' by electrical conductor 34', and with capacitor electrode 24 by electrical conductor 36. Load cells 50 may be included and connected by electrical conductors (not illustrated) with electronic circuit 32. Seat belt latch 58 may include a belt latched sensor connected with electronic circuit 32 by conductor 58'. Distance sensor 52 may be included and connected to electronic circuit 32 by electrical conductor 54.

Instead of routing the aforementioned conductors to electronic circuit 32, the decision making center 46 may be adapted for receiving signals from any or all of the aforementioned conductors 34, 36, 58', and 54 and the electrical conductors (not illustrated) to load cell 50. In addition to the connections illustrated, the decision making center 46 may be connected with various airbag initiators, seat tensioners, dashboard message displays, and other components of a vehicle as known to those skilled in the occupant protection technology. Electronic circuit 32 may be unitary with the decision making center 46 of the vehicle occupant protection system or it may be distinct. If electronic circuit 32 is not unitary with decision making center 46 then electronic circuit 32 is also connected with the decision making center 46 of the vehicle occupant protection system by electrical conductor 38. The occupant presence and position sensing system of the invention may also include seat position sensor 42 connected through conductor 44 to the decision making center 46 of the occupant protection system. It will be appreciated as the description proceeds that the invention may be implemented in different embodiments.

Continuing to proceed with particular reference to FIG. 1, the capacitor electrodes 22, 22', and 24 may be any electrically conductive material that is sufficiently flexible that it will be imperceptible to the seat occupant when placed beneath the fabric of the seat. A preferred material for this purpose is an electrically conductive material supplied for use as seat electrodes by the Minnesota Mining and Manufacturing Company (3M) that are adapted for being adhesively attached to the surface of an open celled, flexible polyurethane foam core of a seat cushion. Another preferred electrically conducting material for capacitor electrodes 22, 22', and 24 is a fabric woven of threads containing metallic wires or partially or entirely woven of metallic wires that are sufficiently fine to provide the flexibility required for seat comfort. Another preferred material is a woven textile fabric on which aluminum or another metal has been vapor deposited or deposited by another method known to those skilled in the art of making electrically conducting fabric.

Electronic circuit 32 may incorporate any of the many known circuits for measuring capacitance and, optionally, Q and which provides sufficient accuracy for measuring capacitances in the range of the capacitances between capacitor electrodes 22, 22' and 24 and any other capacitor electrodes that might be included by one skilled in the relevant arts. In one experimental seat occupant presence and position sensing system 10, the capacitance between capacitor electrodes ranged between five picofarads and five thousand picofarads. A similar measurement range is believed to be likely to be required of other systems. The second capacitor electrode 22' is included if there is a requirement to measure the distances from two locations on the back of the seat to two locations on the back of the seat occupant. Electronic circuit 32 may include a microprocessor or other means for analyzing the measured capacitances, Qs, weights, and distances and providing a signal indicating the measurements and/or interpretations of the measurements to the decision making elements of decision making center 46 of the vehicle occupant protection system.

Seat position sensor 42 if it is included may be any sensor suitable for determining the position of the seat relative to the structure of the vehicle and transmitting that information to the decision making center 46 of the vehicle occupant protection system. A preferred sensor for seat position sensor 42 would be a combination of a known seat track position sensor and a known seat back recline sensor compatible with the seat, the two sensors together fully define the position of the cushion and back of the seat.

The decision making center 46 of the vehicle occupant protection system is preferably an SDM containing an accelerometer for sensing vehicle deceleration during a crash and a microprocessor containing code for analyzing the accelerometer output, which analysis typically integrates the accelerometer output to obtain the first integral of the acceleration. The first integral at each point in time is the change in vehicle speed from the speed before the crash to the speed at that point in time. The microprocessor may also integrate the vehicle speed to determine the second integral of deceleration, which is the distance a free body in the vehicle is displaced relative to the passenger compartment of the vehicle during a crash.

Seat occupant weight sensors 50 if they are included may be any load cells known to be suitable for sensing force from the weight of the seat occupant. Other known sensors responsive to a seat occupant, for instance a single sensor such as a bladder type sensor underlying the seat cushion may be selected by those skilled in the relevant arts.

Distance sensor 52 may be any known distance sensor that can measure the distance to the back of a seat occupant or to the clothing worn by a seat occupant. Distance sensor 52 is preferably a known ultrasonic, optical, or radar sensor adapted to view a narrow angle. The distance sensors commonly used by cameras that focus automatically are a preferred design for distance sensor 52. Distance sensor 52 is preferably pivoted by a mechanism that maintains its view constantly in a horizontal direction as the seat back is reclined. Distance sensor 52 enables determining occupant position over a large range of occupant positions.

Seat belt 56 and latch 58 may be any conventional seat belt and mating latch having a seat belt latched sensor for providing an electric signal or closing a switch to indicate through electrical conductor 58' the seat belt is latched.

Figure 2:
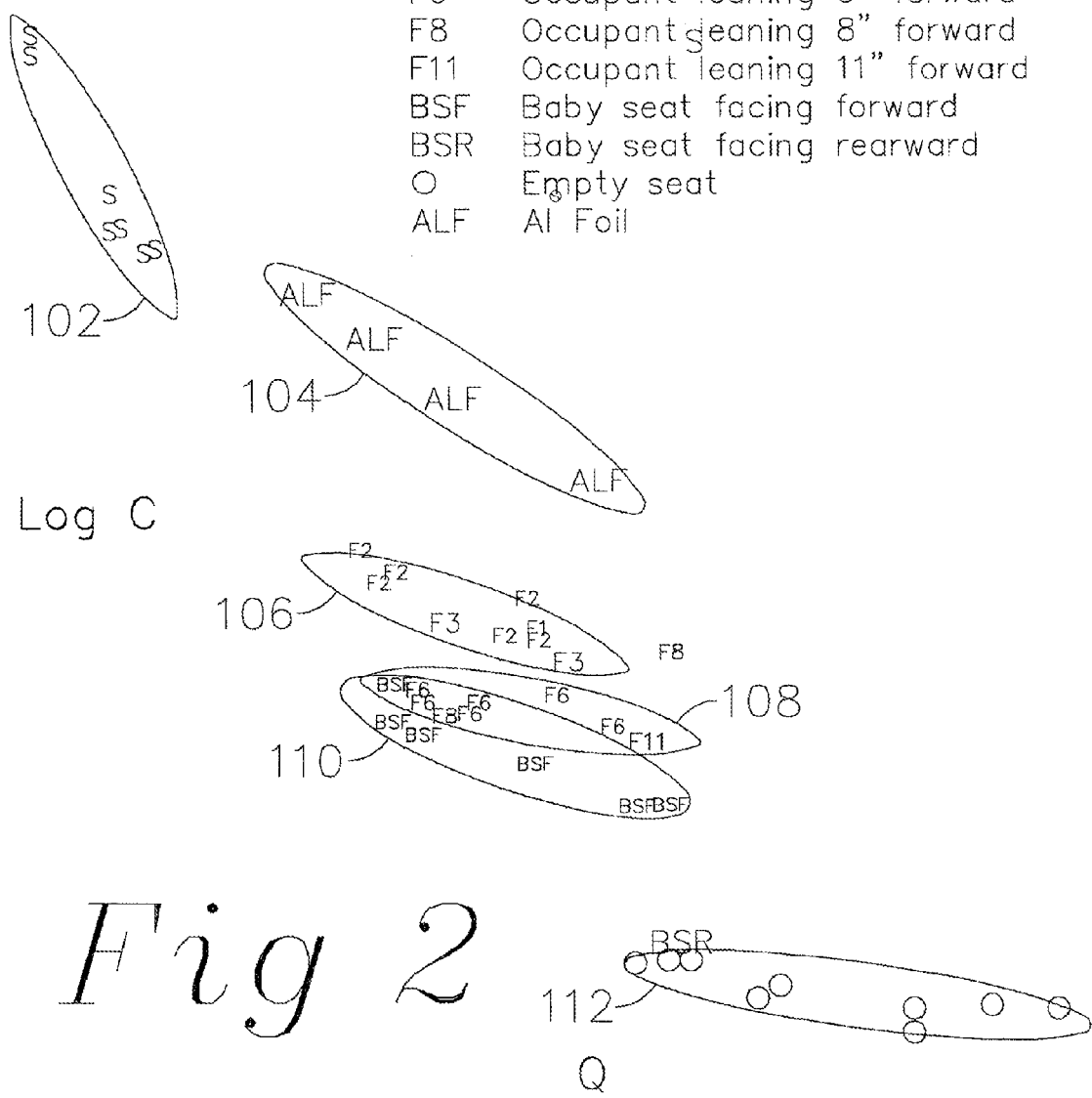
FIG. 2 shows graphically the ranges of capacitance measured between two of the capacitor electrodes illustrated in FIG. 1 for different occupant classes.

Continuing now with reference to FIG. 2, FIG. 2 illustrates measurement points (indicated by letters S, F1, F2, BSF, etc.) resulting from plotting the logarithm of the capacitance as the vertical coordinate and Q as the horizontal coordinate for a number of seat occupant positions and other situations such as a vacant seat, child seat, etc. Measurement points fall into groups around which ovals 102, 104, 106, 108, 110 and 112 are drawn. Further, each oval contains only points that are characteristic of a certain occupant position or other occupant characteristic and, with the exception of ovals 108 and 110, these ovals are clearly distinguished from each other by their physical separation. The fact that, aside from the aforementioned exception of the forward facing baby seat (oval 110), the ovals are physically separated from each other illustrates that different classes of seat occupant are clearly distinguishable. This illustrates that a measurement of capacitance and Q when a person is positioned on the seat (or when the seat is vacant) can determine the position of a person on a seat or the absence of a person and can distinguish between persons and things that are not human.

FIG. 2 shows, for example, seven different measurement points in the oval 102 each represented by the letter "S". Each of the seven points in the oval 102 is the result of making a measurement of capacitance and Q for an occupant seated in a "normally seated" position. For each measurement the position on the horizontal axis corresponding to the measured Q and the position on the vertical axis corresponding to the measured capacitance are located and a letter "S" is placed at the point on FIG. 2 having those horizontal and vertical coordinates. The group of measurement points is distributed so that they fall within an oval-shaped boundary 102. All of the points in oval 102 result from measuring the capacitance and Q for a person seated in a normal position. Oval 106 encloses a group of points "F2" that are obtained from measurements with the seat occupant leaning two inches forward. Oval 106 also encloses one measurement point F1 taken with the occupant leaning one inch forward and one measurement point F3 taken with the occupant leaning three inches forward. All of the points in oval 112 represent a group of measurement points "O" taken with an unoccupied seat. Accordingly, it can be said that all points in oval 102 are "characteristic of measurement points resulting from measurements with the seat occupied by a person in the normal position. Similarly, all points in the oval 112 are characteristic of measurement points resulting from measurements made when the seat is vacant.

The confusion between oval 110 and oval 108 can be explained. The measurements of oval 110 resulted from testing a baby seat having metallic structural elements located where they affected the measured capacitance. Only one of several baby seats tested had a structure that was sensed by the occupant presence and position sensing system of the invention. One way to avoid any possibility of confusion between a forward facing baby seat and a person leaning forward is to use a different baby seat. A recent survey of two stores found no baby seats with a metallic frame. It is evident that the case of a normally seated person indicated by measurements within the oval 102 are very clearly distinguishable from the case of an unoccupied seat indicated by measurements within the oval 112. The cases of the occupant leaning one to three inches forward indicated by measurements within the oval 106 and cases of the occupant leaning six to 11 inches forward indicated by measurements within the oval 108 are very clearly distinguished from the cases of no occupant and cases of a normally seated occupant but are only marginally distinguished from each other. However, the distinction is clear and it is expected to become clearer with further development.

It is desirable to distinguish a person in a seat from something that is not human. The measurements within oval 104 result from placing aluminum foil over the area where an occupant might sit. The different points were obtained by varying the size and position of the aluminum foil. Oval 104 of FIG. 2 is clearly distinguished by its physical separation from ovals 102 and 106, which are the nearest ovals resulting from measurements made with a person in the seat. The clear physical separation between oval 104 and ovals 102 and 106 shows that a person and aluminum foil are clearly distinguished.

It is desired to distinguish a seat occupied by an adult that would require an air bag to be deployed from a seat containing a baby seat where deploying an air bag might cause injury. Most baby seats are molded of plastic and keep the baby sufficiently far from the seat that the occupant presence and position sensing system 10 returns measurements indicating the seat is vacant. Therefore, for such baby seats a baby in a baby seat is easily distinguished from a person who is not in a baby seat. However, certain baby seats incorporate metal frames to which a capacitive sensor responds. For this reason a baby seat having a metal frame was tested both in the forward facing position and in the rearward facing position. In the rearward facing case the metal structure was not near the seat back and the required distinction is easily made. Please refer to the measurement point labeled BSR near oval 112 in FIG. 2 to see the response to the rear facing case. The measurement points for the forward facing case are surrounded by oval 110 in FIG. 2. The data in oval 110 indicate that the baby seat is distinguished from a person in positions where air bag deployment would be desirable but is not distinguishable from the cases where the person is leaning 6 to 11 inches forward and air bag deployment may or may not be desired. For the particular baby seat having a metal frame, the distinction can be enhanced by surrounding the tubular parts of the frame that are closest to the capacitor electrodes 22 and 24 with plastic tubing to increase the distance from the frame to capacitor electrodes 22 and 24 hidden under the fabric of the seat. As mentioned hereinabove, a baby or child seat without a metal frame or one having a frame that has less effect on the capacitance between capacitor electrodes 22 and 24 may be substituted.

Ovals suitable for identifying the required classes of seat occupant are determined for a seat and vehicle by experimenting. The parameters defining the ovals are then permanently stored in the memory of either the microprocessor of the decision making center 46 of the vehicle occupant protection system or in the memory of a microprocessor associated with electronic circuit 32. Preferably, the stored information is the horizontal and vertical components of the major and minor axes of the ovals treated as vectors each divided by the square of the length of the vector as described in detail hereinafter in conjunction with the description of the operation of the invention. Storing components of vectors having inverted lengths reduces the number of computations required when interpreting a capacitance and Q measurement as will be explained hereinafter when describing the operation of the embodiment of the invention wherein electronic circuit 32 includes a microprocessor.

The designs, materials and methods referred to hereinabove are only suggestions and other materials and methods may be selected by those skilled in the relevant arts The operation of the occupant presence and position sensing system 10 of the invention will now be described with reference to FIGS. 1 and 2. In operation of the system, the electronic circuit 32 repeatedly measures the capacitance and Q between capacitor electrodes 22 and 24, and between capacitor electrodes 22' and 24 at a repetition rate such as 100 measurements per second or other repetition rate found to be suitable by those skilled in the relevant arts. One hundred measurements per second enables monitoring the movement of a person as a crash progresses.

The process of associating the result of a measurement of Q and capacitance with a class of seat occupant may be understood as the computerized equivalent of the manual process of plotting the point representing the Q and capacitance in FIG. 2. If it is within an oval then it is assigned to that oval and the seat occupant is assigned to the same class as the other occupants of the oval. For instance, if the point lies within oval 102 then it is assigned to oval 102 and the occupant is assigned to the class of normally seated people. If a measurement point does not fall within an oval it is assigned to the oval to which the measurement point is closest in distance.

In a simplified embodiment of the invention the Q's are not measured and only the capacitance between capacitor electrodes 22 and 24 and between capacitor electrodes 22' and 24 are measured periodically by electronic circuit 32, which transmits each capacitance measurement through conductor 38 to the decision making center 46 of the vehicle occupant protection system. The decision making center 46 then considers the recently received capacitance value when it makes its decision to deploy or not deploy the air bags. Referring to FIG. 2, it can be seen that capacitance alone is sufficient to estimate the distance of the back of a person to the back of the seat and to determine if a seat is vacant but is not adequate for distinguishing aluminum foil from a person and is inferior to the combination of the logarithm of capacitance combined with Q for ascertaining the distance from the back of a person to the seat back.

In a variation of the aforementioned embodiments of the invention illustrated by FIG. 1, the electronic circuit 32 transmits each measurement of capacitance and Q through conductor 38 to the decision making center 46 of the vehicle occupant protection system. The decision making center 46 saves a predetermined number of measurements and considers the current and saved measurements when it makes its decision to deploy or not deploy the air bag.

In yet another variation of the aforementioned embodiments of the invention illustrated by FIG. 1, electronic circuit 32 and the decision making center 46 of the vehicle occupant protection system are consolidated into decision making center 46. In this embodiment electrical conductors 34 and 36 are routed directly (not illustrated) from capacitor electrodes 22, 22' and 24 to decision making center 46, which includes an electronic circuit 32' adapted for measuring the capacitance between capacitor electrodes 22 and 24 and capacitor electrodes 22' and 24. This embodiment may classify seat occupants into the same classes as embodiments in which electronic circuit 32 and the decision making center 46 of the vehicle occupant protection system are not consolidated into decision making center 46.

In yet another embodiment of the invention illustrated by FIG. 1, electronic circuit 32 includes a microprocessor that interprets the measurements and supplies the interpretations to the decision making center 46 of the vehicle occupant protection system. In this embodiment electronic circuit 32 examines the capacitance and Q of each measurement to determine to which oval the measurement should be assigned and transmits information identifying that oval to the decision making center 46 of the occupant protection system. Preferably, a number identifying that oval is transmitted. For example, if the point is assigned to oval 102, the number 1 might be transmitted, if the point is assigned to oval 104 the number 2 might be transmitted, etc. The significance of 1, 2, etc. is preferably programmed into the decision making center during manufacture. The assigned oval is preferably identified by a process, repeated for each oval, that is equivalent to transforming the coordinates of the graph to convert the oval to a circle of unit radius. For each measurement of capacitance and Q the distance in the transformed coordinate system from the measurement point to the center of the circle representing the oval is computed. This is repeated for each oval. The oval for which the distance from the measurement point to the center of the corresponding circle is smallest is selected as the oval to which the measurement is assigned.

The preferred process is described in the following: For each oval, vectors $V_{Major}$ and $V_{Minor}$ are defined from the center of the oval to the upward ends of its major and minor axes respectively. Vector $V_{Major}$ is divided by the square of its length and vector $V_{Minor}$ is divided by the square of its length to obtain two vectors $V_{MajorBar}$ and $V_{MinorBar}$ having lengths that are the reciprocals of the lengths of the original vectors. Vectors $V_{MajorBar}$ and $V_{MinorBar}$ are defined by their horizontal and vertical components $V_{MajorBarQ}$, $V_{MajorBarC}$ and $V_{MinorBarQ}$, $V_{MinorBarC}$ respectively. For each oval the coordinates of the center of the oval and the components $V_{MajorBarQ}$, $V_{MajorBarC}$, $V_{MinorBarQ}$, and $V_{MinorBarC}$ are stored at manufacturing time in the memory of the microprocessor of electronic circuit 32. Each measurement of capacitance and Q defines a set of vectors $MP_{Oval}$, one vector for each oval, which is a vector from the center of the oval to the measurement point on the Q-log(Capacitance) (or, for brevity, Q-logC) plane. Each vector $MP_{Oval}$ is defined by its horizontal and vertical components $MP_{OvalQ}$ and $MP_{OvalC}$ respectively. The horizontal component $MP_{OvalQ}$ of $MP_{Oval}$ is the difference between the Q coordinate of the center of the oval in the Q-logC coordinate system and the measured Q. The vertical component $MP_{OvalC}$ of $MP_{Oval}$ is the difference between the logC coordinate of the center of the oval in the Q-logC coordinate system and the logarithm of the measured capacitance. For each of the ovals the vector dot (scaler) products of $MP_{Oval}$ and the corresponding vectors $V_{MajorBar}$ and $V_{MinorBar}$ are computed. For each oval the vector dot products are computed according to the formulas:

$$MP_{Oval} \cdot V_{MajorBar} = MP_{OvalC} \cdot V_{MajorBarC} + MP_{OvalQ} \cdot V_{MajorBarQ}$$

and $$MP_{Oval} \cdot V_{MinorBar} = MP_{OvalC} \cdot V_{MinorBarC} + MP_{OvalQ} \cdot V_{MinorBarQ}$$

The square of the distance from the center of the oval to the measurement point in the transformed Q-logC coordinate system is computed according to the formula:

$$\text{Distance Squared} = (MP_{Oval} \cdot V_{MajorBar})^2 + (MP_{Oval} \cdot V_{MinorBar})^2$$

Each dot product is the scaled projection of the vector $MP_{Oval}$ on one of the axes of the oval. Distance Squared is less than 1.0 when the measurement point plotted in the Q-logC plane is inside an ellipse that is centered at the center of the oval and has major and minor axes equal to the major and minor axes respectively of the oval. For each oval, Distance Squared is a measure of how far the measurement point is from the boundary of the oval. Distance Squared is less than 1.0 when the measurement point is inside the aforementioned ellipse. Distance Squared is greater than 1.0 when the measurement point is outside the aforementioned ellipse. The process of assigning a measurement point to an oval consists of calculating Distance Squared for each oval and selecting the oval for which Distance Squared is least. The number of the oval for which Distance Squared is least is then transmitted to the decision making center 46 of the occupant protection system.

In a fourth embodiment of the invention, electronic circuit 32 contains a read only memory containing an array having the desired oval identifying number for each possible pair of capacitance and Q coordinates. For example, if the electronic circuit 32 were designed to measure the capacitance as one of thirty possible values and Q as one of thirty possible values, an array containing 900 values of oval identifying numbers with 30 rows for the thirty values of capacitance and 30 columns for the thirty values of Q enables the microprocessor to use the measured capacitance and Q to select the appropriate number from the array. The oval identifying number selected from the array according to the capacitance and Q is transmitted to the decision making center 46 of the occupant protection system.

Embodiments of the invention that include seat position sensor 42 enable the location of an occupant relative to the interior of the vehicle to be determined during a crash. For this purpose, the occupant presence and position sensor of the invention regularly informs the decision making center 46 of the distance from the seat back to the back of the occupant. Each time the microprocessor in the decision making center 46 receives a set of measurements, it computes the positions of parts of the occupant such as the head and the chest based upon the distance from the back of the seat to the back of the person, the position of the seat provided by seat position sensor 42, and average dimensions of the seat occupant. If the occupant weight is known from such as load cells 50, average dimensions for a person of that weight are used. For the purpose of estimating where the occupant will be in the future, the microprocessor in the decision making center 46 may also estimate the velocity of a part such as the chest of the seat occupant relative to the vehicle by computing the difference between the current position of the part of the seat occupant and the previous position of the part of the seat occupant and dividing the difference by the time interval between the measurements.

For example, if the distance from the back of the seat to the back of the person is zero (the normal condition) the torso might be assumed to be an average torso having its front surface offset from the surface of the back of the seat by the thickness of an average torso and approximately parallel with the back of the seat, and the location of the head would then be calculated to be above the torso. If the seat is equipped for occupant weight sensing by such as load cells 50 then the thickness of the torso would be based on the occupant's weight instead of being an average for all humans.

For a second example, if distance sensor 52 is located twelve inches above the seat cushion, the torso of the occupant is known to measure ten inches from back to front, and distance sensor 52 measures the distance from the seat back to the back of the seat occupant to be four inches, which might be because the occupant is leaning forward, then the front surface of the torso could be calculated to be at a plane located about ten inches offset from a plane beginning at the meeting of the seat cushion and the seat back and rising at an angle that places the surface of the plane four inches from the surface of the seat back at the height of distance sensor 52. This is not the only possibility. The occupant may not be leaning forward, rather the entire occupant may be moving forward, because of the decelerations that might happen during a crash. Using the occupant position obtained as just described for both the case of the occupant leaning forward and the case of the occupant moved forward may be acceptable for airbag deployment calculations because it is the distance from the seat back to the upper back of the occupant that determines the position of the part of the occupant that receives the greatest force from interaction with the airbag. Whether the torso of the occupant is leaning forward or the entire torso has moved forward only affects the angle of the axis of the torso from the vertical and not the distance of the chest of the occupant from the airbag. Knowing the forward position of the part of the occupant to which the airbag applies the greatest force may be sufficient for optimally deploying the airbag.

In an alternate second example to the aforementioned second example, consider the occupant to be moving forward relative to the vehicle structure consequent to a crash. The fact that a crash has occurred is known to the decision making center 46 from the accelerations measured by the accelerometer of the decision making center 46. For example, if recent observations of the position of the occupant placed the occupant in a normal seated position and if the distance from the back of the seat to the back of the seat occupant is currently measured to be four inches, then the front surface of the torso may be estimated to be in a plane parallel with the back of the seat and offset from the surface of the back of the seat by a distance that is the best estimate of the thickness of the torso of the occupant. The head may be estimated to be located above the torso.

In many crashes the decision making center 46 may need to initiate airbag deployment about forty milliseconds before the seat occupant of the alternate second example moved forward four inches from the position occupied prior to the crash, making knowledge of the position of the occupant of little value in that crash.

However, braking prior to the crash may cause the occupant to be out of the normal seated position and moving forward when decision making center 46 determines it should initiate airbag deployment. Also, there are crashes that include multiple collisions in which the first collision does not warrant airbag deployment but a later collision does warrant airbag deployment. In these circumstances knowledge of the position and forward velocity of the seat occupant relative to the vehicle may be useful.

Continuing with the foregoing alternate second example in which the forward position of the occupant is the result of movement caused by the deceleration of a crash. Continuing with the example, suppose that 0.01 seconds prior to the aforementioned exemplary measurement (4.0 inches from the seat back to the occupant's back) the distance from the back of the seat to the back of the seat occupant was measured to be 3.1 inches. From these two measurements it can be calculated that the occupant was moving forward relative to the vehicle at an average speed of 90 inches per second during the most recent 0.01 second interval.

In the foregoing alternate example the three following conditions are possible:

1) Both the shoulder and the lap belts are operational and occupant movement will soon stop because the belts will limit further forward movement of the occupant. The belt latched indicator is on.
2) Only the lap belt is engaging the occupant. This could happen if the occupant shifted the shoulder belt to the side, possibly because the occupant was uncomfortable with the shoulder belt in the correct position. In this case the occupant will rotate forward about the lap belt and the upper part of the torso and the head will move approximately as a free body. In this case the belt latched indicator is on.
3) The seat belts are not operational and the occupant is moving as free body. The belt latched indicator will be on if, for example, the buckle is latched and the occupant is sitting on the seat belt. Otherwise the belt latched indicator will be off.

Continuing with the alternate second example, the possibility 1) can be tested by continuing to monitor the distance from the back of the seat occupant to the seat back. Cases 2) and 3) result in similar initial movement of the head and chest, which is the movement of a free body inside the vehicle. After eight or more inches of forward movement cases 2) and 3) begin to differ because of the downward rotation of the torso in case 2), which is probably after the decision to deploy the airbag must be made. The projected forward movement of the occupant from the initial (moved four inches forward) position may be calculated by using the following expression for the movement of a free body:

$$S(t) = S_0 + \int_{T_0}^{T} \left( V_0 + \int_{T_0}^{T} a \cdot dt \right) dt$$

where S(t) is the computed distance from the seat back at time t, $S_0$ is the initial distance from the seat back (four inches in the current example) at initial time $T_0$, $V_0$ is the velocity at time $T_0$ (90 inches per second in the current example), and a is the deceleration of the vehicle measured by the accelerometer in the decision making center 46.

In a third example involving an embodiment of the invention having capacitor electrode 22', the distance from the back of the seat to the back of the seat occupant is measured to be two inches at a height of four inches above the seat cushion based upon the capacitance between capacitor electrodes 22' and 24. Further, the distance from the back of the seat to the back of the seat occupant is measured to be three inches at a height of fourteen inches above the seat cushion based upon the capacitance between capacitor electrodes 22 and 24. This measurement could result from the initial deceleration at the beginning of a vehicle crash. From these measurements the front surface of the torso would be calculated to be about ten inches offset (assuming an average person) from a plane surface intersecting a horizontal line transverse to the vehicle movement and intersecting a point four inches from the surface of the seat cushion and two inches from the surface of the seat back and also intersecting a point three inches from the surface of the seat back at a height fourteen inches above the surface of the seat cushion.

Continuing with the third example, the occupant may be moving. For example, assume the previous measurement of the position of the occupant was made 0.01 second earlier than the current position was measured and, at that time, the distance from the back of the seat to the back of the seat occupant was 1.7 inches at capacitor electrode 22' and was 2.7 inches at capacitor electrode 22. The occupant was, therefore, moving forward relative to the vehicle at an average speed of 30 inches per second during the most recent 0.01 second interval. When the inertia of the occupant causes the occupant to move sufficiently forward of the normal seated position to where the capacitance between capacitor electrodes 22 and 24 does not accurately indicate the position of the seat occupant, the position of the occupant can be calculated from the position and time when the position is accurately indicated by using the following expression:

$$S(t) = S_0 + \int_{T_0}^{t}\left(V_0 + \int_{T_0}^{t} a \cdot dt\right)dt$$

where S(t) is the computed position at time t, $S_0$ is the distance from a reference position (two inches and three inches from the seat back in this example) at time $T_0$ when the position is known, $V_0$ is the velocity at time $T_0$ (30 inches per second in this example) and a is the deceleration measured by the accelerometer in the decision making center 46.

During a crash, if the occupant is not belted the occupant will move as a free body and the parts of the occupant will move forward from their initial positions relative to the interior of the vehicle a distance equal to the second integral of the acceleration. Therefore, when it is known that the seat belt is not fastened from the sensor in latch 58 and the seat occupant has moved beyond where the position can be measured by the occupant presence and position sensor of the invention, the position of the occupant is estimated by projecting forward the position of the occupant measured at an earlier time such as when the crash began.

During a crash, if the occupant is belted as indicated by the sensor in latch 58, the lap belt may allow the lower part of the occupant limited movement. Further, the head and shoulders may move forward by an amount allowed by the shoulder belt. Accordingly, the parts of the occupant will move forward from their initial positions a distance equal to the second integral of the deceleration but limited by the belts. Depending on the seat belts, this movement may put the occupant beyond the distance where the capacitance based position sensing system of the invention can measure the occupant position.

When the occupant moves beyond the range of capacitance based distance sensing, then the larger distances from the back of the seat to the back of the seat occupant may be measured by sensor 52. Distance sensor 52 provides distance measurements repeatedly at a repetition rate such as 100 times per second or another repetition rate found to be suitable by those skilled in the relevant arts. Distance sensor 52 may be a radar or ultrasonic distance sensor that may not provide accurate distance measurements when the back of the seat occupant is near or against the seat back. Also, distance sensor 52 may be disabled by something covering sensor 52 such as a coat draped over the seat back. To assure correct operation, the distance measured by distance sensor 52 is compared with the distance ascertained from the capacitance between capacitor electrodes 22 and 24. If there is agreement over a range of distances, then distance sensor 52 is assumed to accurately measure the occupant position at distances not ascertainable from the capacitance between capacitor electrodes 22 and 24. If there is a difference in the distance measurement then the difference may be used to adjust the calibration of distance sensor 52 by the difference. Also, distance measured by sensor 52 may be used to confirm occupant positions determined by integrating the deceleration of a crash. Distance measured by sensor 52 may provide a reason to not deploy an airbag if very large distances between the back of the seat and the back of the seat occupant suggest the occupant is located where deployment might injure the seat occupant.

The estimated occupant position based on the movement of a free body according to the measured deceleration and the occupant position determined from measurement of the distance from the back of the occupant to the surface of the seat back are both known within the occupant protection system. If the measured position of the seat occupant agrees with the calculated position to which a free body would have moved then: i) the seat belt may not be properly installed, or ii) the occupant may be unbelted (i.e. sitting on the latched belt), or iii) the payout of the belt is not yet complete. Knowledge of the parameters of the belt can be used to determine whether the belt is still paying out or is not functioning as intended.

Accordingly, the seat occupant sensing system of the invention can determine during a crash if the seat belt is restraining the seat occupant. During a crash, the distance from the upper back of the occupant to the back of the seat and the distance to the lower back of the occupant to the back of the seat are separately measured. If, during a crash or other sudden deceleration, both readings indicate the entire torso is moving forward in rough agreement with the second integral of the deceleration, then the absence of seat belts may be assumed if the distance the occupant has moved is inconsistent with the expected performance of the seat belt. Similarly, if, during a crash or other sudden deceleration, both readings indicate the entire torso is moving forward less than a free mass would move then the seat belt may be assumed to be functioning. A third possibility that can be ascertained if capacitor electrode 22' is included is that the lower torso is not moving forward like a free body but the upper torso is moving as a free body would move. These indications suggest that the shoulder part of the seat belt is not correctly installed but the lap part is. Knowing the state of the seat belt provides information that might enables the occupant protection system of the vehicle to deploy the air bags optimally for certain crashes, particularly crashes that last for an extended time period. For example, in the case wherein the first obstacle struck slows the vehicle but does not stop the vehicle the movement of the seat occupant may be a limited movement indicating that the seat belts are functional. In a second and more severe crash the knowledge that the seat belts are functioning may provide a basis for a more powerful deployment of the air bags.

Figure 5:
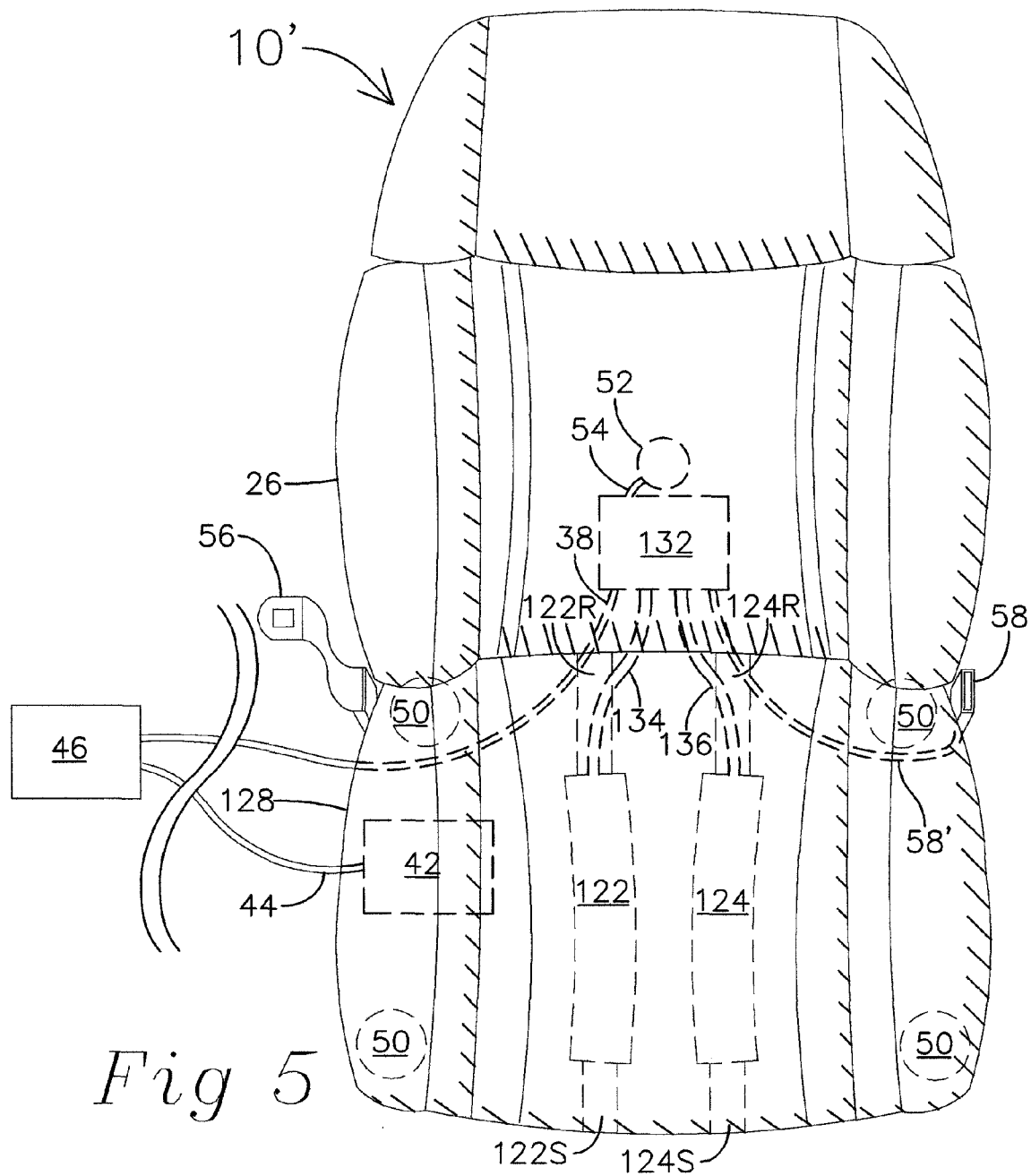
FIG. 5 shows an automobile seat having a capacitive seat occupant sensor of inherently low manufacturing cost.

Referring now to FIG. 5, the occupant presence and position sensing system 10' is a low cost system adapted for systems wherein it is desired to deploy airbags when the a human is sitting in the vehicle seat comprising seat back 26 and seat cushion 128 and not deploy airbags when there is an infant or a small child in an infant or child seat. As mentioned hereinabove, a low cost way to disable deployment for an infant in an infant seat is particularly desired for occupant protection systems comprising a low risk deployment airbag.

Occupant presence and position sensing system 10' comprises an electronic circuit 132 connected with the decision making center 46 of the occupant protection system of the vehicle. In addition to the connections illustrated, decision making center 46 is connected with various airbag initiators, seat tensioners, dashboard message displays, and other components of a vehicle as is known to those skilled in the arts of occupant protection. Occupant presence and position sensing system 10' comprises two capacitor electrodes 122 and 124 located beneath the fabric of vehicle seat cushion 128. Electronic circuit 132 is connected with capacitor electrode 122 by an electrical conductor 134 and with capacitor electrode 124 by an electrical conductor 136. Load cells 50 may be included and connected by electrical conductors (not illustrated) with electronic circuit 132 or with decision making center 46. Seat belt latch 58 may include a belt latched sensor connected with electronic circuit 132 or with decision making center 46 by an electrical conductor such as electrical conductor 58'. Distance sensor 52 may be included and connected to electronic circuit 132 or decision making center 46 by an electrical conductor such as electrical conductor 54.

The decision making center 46 may be adapted to perform any or all of the functions of electronic circuit 132 and may be connected as required to any or all of the aforementioned sensors by the aforementioned electrical conductors such as 134, 136, 58' and 54 and the electrical conductors (not illustrated) to load cells 50. Electronic circuit 132 may be unitary with the decision making center 46 of the vehicle occupant protection system or it may be distinct. If electronic circuit 132 is not unitary with decision making center 46 then electronic circuit 132 is connected through electrical conductor 38 with decision making center 46. The occupant presence and position sensing system of the invention may also include seat position sensor 42 connected through electrical conductor 44 to the decision making center 46 of the occupant protection system or to electronic circuit 132. As the description proceeds it will be appreciated that the invention may be implemented in different embodiments.

Continuing to proceed with particular reference to FIGS. 5, 6, and 7 the capacitor electrodes 122 and 124 may be made of any electrically conducting material that is sufficiently flexible that it is imperceptible to the seat occupant when placed beneath the fabric of the seat. A first preferred material is an electrically conductive material supplied for use as capacitor electrodes in seats by the Minnesota Mining And Manufacturing (3M) Corporation that are adapted for being adhesively attached to the surface of an open celled, flexible polyurethane foam core of a seat cushion. Another preferred electrically conducting material for capacitor electrodes 122 and 124 is a fabric woven partially or entirely of metallic wires (or threads that contain metallic wires) and that provides flexibility for seat comfort. Another preferred material is a woven textile fabric on which aluminum or another metal has been vapor deposited or deposited by another method known to be suitable by those skilled in the art of making electrically conducting fabric. A most preferred material is a pleated sandwich of two thin sheets of a flexible polymer such as polyester between which a metal is deposited in selected areas as illustrated in FIG. 6. Straps 122R and 122S extending from capacitor electrode 122 and straps 124R and 124S extending from capacitor electrode 124 are preferably extensions of the flexible polymer that may be provided to assist in keeping capacitor electrodes 122 and 124 in their positions between the fabric and the foam cushion of seat cushion 128.

Electronic circuit 132 may comprise any of the many known circuits for measuring capacitance and which provides sufficient accuracy for measuring capacitances in the range of the capacitance between capacitor electrodes 122 and 124. In one experimental seat occupant presence and position sensing system the capacitance between capacitor electrodes ranged between fifteen picofarads and five hundred picofarads. A similar measurement range is believed to be likely to be required for system 10'. Electronic circuit 132 may include a microprocessor or other means for analyzing the measured capacitances, weights, and distances and providing a signal indicating the measurements and/or interpretations of the measurements to the decision making elements of decision making center 46 of the vehicle occupant protection system. In the most preferred embodiment of the capacitor electrodes comprising a pleated sandwich the functions of analyzing the measured weights and distances if required are preferably performed by decision making center 46.

Seat position sensor 42 if it is included may be any sensor suitable for determining the position of the seat relative to the structure of the vehicle and transmitting that information to the decision making center 46 of the vehicle occupant protection system or to electronic circuit 132. A preferred sensor for seat position sensor 42 would be a combination of a known seat track position sensor and a known seat back recline sensor compatible with the seat, the two sensors providing sufficient information to fully define the positions of the seat cushion and back.

The decision making center 46 of the vehicle occupant protection system is preferably an SDM containing an accelerometer for sensing vehicle deceleration during a crash and a microprocessor containing code for analyzing the accelerometer output, which analysis typically integrates the accelerometer output to obtain the first integral of the deceleration. The first integral at each point in time is the change in vehicle speed from the speed before the crash to the speed at that point in time. The microprocessor may also integrate vehicle speed to determine the second integral of deceleration, which is the distance a free body in the vehicle is displaced relative to the passenger compartment of the vehicle during a crash.

Seat occupant weight sensors 50 if they are included may be any load cells known to be suitable for sensing force from the weight of the seat occupant. Other known sensors responsive to a seat occupant, for instance a single sensor such as a bladder type sensor underlying the seat cushion, may be substituted by those skilled in the relevant arts.

Distance sensor 52 may be any known distance sensor that can measure the distance to the back of a seat occupant or to the clothing worn by a seat occupant. Distance sensor 52 is preferably a known ultrasonic, optical, or radar sensor known by those skilled in the art to be suitable for making the measurement. One preferred distance sensor 52 is one of the distance sensors made for cameras that focus automatically and is known by those skilled in the art to be suitable. Distance sensor 52 may be pivoted by a mechanism that maintains its direction of observation constantly in a horizontal direction as the seat back is reclined.

Seat belt 56 and latch 58 may be any conventional seat belt with its latch and may be adapted to provide or control an electric signal to indicate through electrical conductor 58' that seat belt 56 is latched.

The operation of the occupant presence and position sensing system 10' of the invention will now be described with reference to FIG. 5. In operation of the system, the electronic circuit 132 repeatedly measures the capacitance between capacitor electrodes 122 and 124 at a repetition rate such as 10 measurements per second or other repetition rate found to be suitable by those skilled in the relevant arts. Electronic circuit 132 may operate to determine from the capacitance measurements if the seat contains a normally seated person or something of lower capacitance such as an infant in an infant seat or a child in a child seat, or another object and communicate the determination though conductor 38 to decision making center 46. Alternately, electronic circuit 132 may operate to transmit the capacitance measurement though conductor 38 to decision making center 46, which operates to determine from the capacitance measurements if the seat contains a normally seated person or something of lower capacitance such as an infant in an infant seat or a child in a child seat, or another object or is empty.

In a particularly inexpensive embodiment, electronic circuit 132 operates to ascertain if the capacitance measured between capacitor electrodes 122 and 124 is above or below a predetermined value of capacitance. If the capacitance is greater than the predetermined value, electronic circuit 132 provides an electric signal to the decision making center 46 of the vehicle occupant protection system 46 indicating that the seat is occupied by a human sitting on the seat, in which case the decision making center 46 of the vehicle occupant protection system might deploy an airbag in the event of a crash. If the capacitance measured between capacitor electrodes 122 and 124 is less than the aforementioned predetermined value, electronic circuit 132 provides an electric signal indicating that the seat is empty or occupied by an infant in an infant seat or by such as cargo; in which cases the decision making center 46 of the vehicle occupant protection system would suppresses airbag deployment. It may be desired to distinguish a child in a child seat from an empty seat. For this purpose, if the capacitance measured between capacitor electrodes 122 and 124 is below a second predetermined value that is lower than the capacitance measured when the seat is occupied by an infant or a child in an infant or child seat the decision making center 46 of the vehicle occupant protection system takes the action those skilled in the relevant arts have specified it should take.

In a preferred simplified embodiment of the invention illustrated by FIG. 5, only the capacitance between capacitor electrodes 122 and 124 is measured by electronic circuit 132. The Q is not measured. This embodiment operates to distinguish a person sitting in the seat from an infant or a child in an infant or child seat. This information is sufficient for certain systems comprising a low risk deployment airbag. Electronic circuit 132 transmits each capacitance measurement through conductor 38 to the decision making center 46 of the vehicle occupant protection system. The decision making center 46 then considers the most recently received capacitance value or the most recently received capacitance value in combination with one or more of the capacitance values previously received if a crash occurs that requires an air bag to be deployed.

In a variation of the aforementioned simplified embodiment of the invention, the electronic circuit 132 transmits each measurement of capacitance through conductor 38 to the decision making center 46 of the vehicle occupant protection system as just described. The decision making center 46 saves a predetermined number of measurements and considers the current and saved capacitance values when deciding if an airbag should be deployed. For example, when a crash that warrants deploying an airbag has occurred, if the capacitance measurements for a period of time prior to the current time indicated a human was seated in the seat but the most recent capacitance measurement did not indicate a human was seated in the seat, it is likely that the decision making center 46 would be programmed to deploy the airbag because the seat occupant would be presumed to continue to be a human.

In yet another variation of the aforementioned simplified embodiment of the invention illustrated by FIG. 5, electronic circuit 132 includes a microprocessor that interprets the capacitance measurements and supplies the interpretations to the decision making center 46 of the vehicle occupant protection system. In this embodiment, for example, for each capacitance measurement electronic circuit 132 might determine if the capacitance is above or below a predetermined threshold such that a capacitance higher than the threshold indicates there is a person sitting in the seat and transmits a characterization of the seat occupant to the decision making center 46 of the occupant protection system.

In yet another variation of the aforementioned simplified embodiment of the invention illustrated by FIG. 5, capacitance sensing circuit 132 and the decision making center 46 of the vehicle occupant protection system are consolidated into a unitary decision making center 46. In this embodiment electrical conductors 134 and 136 are routed directly (not illustrated) from capacitor electrodes 122 and 124 to decision making center 46, which includes an electronic circuit (not illustrated) adapted for measuring the capacitance between capacitor electrodes 122 and 124. For each capacitance measurement an electronic circuit in decision making center 46 classifies the seat occupant as described hereinabove and saves information related to the measurements and makes that information available within decision making center 46.

Embodiments of the invention illustrated in FIG. 5 that include seat position sensor 42 and distance sensor 52 can determine the location of the occupant relative to the interior of the vehicle during a crash. To accomplish this, distance sensor 52 continuously informs electronic circuit 132 or decision making center 46 of the distance from the seat back to the occupant's back. At predetermine times the microprocessor of decision making center 46 computes the positions of parts of the occupant such as the head and the chest relative to the structure of the vehicle based upon the distance from the back of the seat to the back of the person, the position of the seat provided by seat position sensor 42, and average dimensions of the seat occupant. If the occupant weight is known, which it would be if load cells 50 are included, average dimensions for a person of that weight are used. For the purpose of estimating where the occupant will be in the future, the microprocessor in the decision making center 46 may also estimate the velocity of one or more parts of the seat occupant relative to the vehicle by computing the difference between the current position of the seat occupant part and the previous position of the seat occupant part and dividing the difference by the time interval between the measurements.

For example, if the distance from the back of the seat to the back of the person is zero (the normal condition) the torso might be assumed to be an average torso having its front surface offset from the surface of the back of the seat by the thickness of an average torso, and the location of the head would be assumed to be located above the torso. If the seat is equipped for occupant weight sensing by such as load cells 50 then an average thickness of a torso of a person of the measured weight would be used.

In a second example it is assumed that distance sensor 52 is located twelve inches above the seat cushion, the occupant weight suggests the torso of the occupant measures ten inches from back to front, and distance sensor 52 measures the distance from the seat back to the back of the seat occupant to be four inches (which might happen if the occupant is leaning forward), then the front surface of the torso would be calculated to be at a plane located about ten inches offset from a plane beginning at the meeting of the seat cushion and the seat back and rising at an angle that places the surface of the plane four inches from the surface of the seat back at the height of distance sensor 52. This is not the only interpretation of the measurements. The occupant may not be leaning forward; rather the entire occupant may be moving forward, which could happen during a crash if the seat belt is not latched. Even with the aforementioned uncertainty resulting from the alternate interpretations, the calculated position is likely to be sufficiently accurate for its intended purpose of influencing deployment of an airbag.

In an alternate to the aforementioned second example it is assumed that the occupant is moving forward relative to the vehicle structure because of a crash. The fact that a crash has occurred is known to the decision making center 46 from the accelerations measured by the accelerometer of decision making center 46. It is also assumed that the most recent observation of the position of the occupant places the back of the seat occupant four inches from the back of the seat.

In many crashes, decision making center 46 may be need to initiate airbag deployment about forty milliseconds before the seat occupant moves forward four inches from the position prior to the crash, which would make knowledge of the position of the occupant of little value in that crash.

However, braking prior to the crash or other factors may cause the occupant to be out of the normal seated position and moving forward when decision making center 46 initiates airbag deployment. An example of another factor would be a crash that includes multiple collisions in which the first collision does not warrant airbag deployment but a later collision does warrant airbag deployment. In these circumstances knowledge of the position and forward velocity of the seat occupant relative to the vehicle may be useful.

Continuing with the foregoing alternate second example, in which the forward position of the occupant is the result of movement caused by the deceleration of a crash; assume now that 0.01 seconds prior to the aforementioned exemplary measurement (4.0 inches from the seat back to the occupant's back) the distance from the back of the seat to the back of the seat occupant was measured to be 3.1 inches. From these two measurements it can be calculated that the occupant was moving forward relative to the vehicle at an average speed of 90 inches per second during the most recent 0.01 second interval.

In the alternate second example the condition of the seat belt is likely to be one of the three following conditions:
1) Both the shoulder and the lap belts are operational and occupant the belts will soon stop forward movement of the occupant. The belt latched indicator is on.
2) Only the lap belt is engaging the occupant. This could happen if the occupant shifted the shoulder belt to the side, possibly to improve comfort. The torso and head will rotate about the lap belt and the upper part of the torso and the head will move approximately as a free body. The belt latched indicator is on.
3) The seat belt is not latched or the occupant is sitting on a latched belt and the occupant is moving as free body. The belt latched indicator will be on if the buckle is latched. Otherwise the belt latched indicator will be off.

Continuing with the alternate second example, the possibility 1) can be tested by observing if the occupant moves much less than a free body would move based upon the measured deceleration. Cases 2) and 3) result in similar initial movement of the head and chest, which is the movement of a free body inside the vehicle. After some forward movement cases 2) and 3) begin to differ because the torso of case 2) rotates downward while the torso of case 3) moves as a free body. The forward movement of the occupant moving forward as a free body from the initial position is the second integral of the deceleration calculated from:

$$S(t) = S_0 + \int_{T_0}^{t}\left(V_0 + \int_{T_0}^{t} a \cdot dt\right)dt$$

where $S(t)$ is the distance from the seat back at time t, $S_0$ is the initial distance from the seat back (four inches in the current example) at initial time $T_0$, $V_0$ is the velocity at time $T_0$ (90 inches per second) and a is the deceleration of the vehicle measured by the accelerometer in the decision making center 46.

During a crash, if the occupant is not belted the occupant will move as a free body and the parts of the occupant will move forward from their initial positions relative to the interior of the vehicle a distance equal to the second integral of the acceleration. Therefore, when it is known that the seat belt is not fastened because the belt latched sensor in latch 58 so indicates and a crash is in progress the position of the occupant can be estimated to be the occupant position measured at an earlier time adjusted by the amount of the second integral.

During a crash, if the occupant is belted as indicated by the sensor in latch 58, the lap belt may allow the lower part of the occupant limited movement. Further, the head and shoulders may move forward by an amount allowed by the shoulder belt. Accordingly, the parts of the occupant will move forward from their initial positions a distance equal to the second integral of the deceleration but limited by the belts.

Distance sensor 52 provides distance measurements repeatedly at a repetition rate such as 100 times per second. Distance sensor 52 is preferably a radar or ultrasonic distance sensor adapted to provide accurate distance measurements when the back of the seat occupant is near or against the seat back. One way this may be accomplished is by locating distance sensor 52 deep within the upholstery of seat back 26. Any other distance sensor known to be suitable may be selected by those skilled in the relevant arts. A very large distance measured by sensor 52 may suggest the occupant is located where deployment might injure the seat occupant.

A preferred capacitive occupant sensor 10" for occupant sensing system 10' illustrated in FIG. 5 will now be described with reference to FIGS. 5, 6, and 7. Capacitive occupant sensor 10" provides a unitary sensor 10" that replaces the following elements of occupant sensing system 10' illustrated in FIG. 5: capacitance sensing circuit 132, capacitor electrodes 122 and 124, straps 122R, 122S, 124R, and 124S; and electrical conductors 134, 136, and 38.

Capacitive occupant sensor 10" comprises capacitor electrodes 122 and 124 connected through conductors 134 and 136 respectively, printed circuit contacting pads 154 and 156 respectively, and printed circuit traces 154' and 156' respectively with capacitance sensing circuit 132'. Capacitor electrodes 122 and 124, conductors 134 and 136, and capacitance sensing circuit 132' are enclosed in sealed outer enclosure 144. Capacitance sensing circuit 132' performs the capacitance sensing functions of electronic circuit 132 illustrated in FIG. 5. Electrical conductors 38 connect capacitive occupant sensor 10" with decision making center 46.

An occupant sensing system 10' that comprises capacitive occupant sensor 10" may include load cells 50, distance sensor 52, and seat latched sensor 58. If distance sensor 52 is included, cable 54 is preferably connected with decision making center 46 instead of capacitance sensing circuit 132'. If seat belt latched sensor 48 is included, cable 58' is preferably connected with decision making center 46 instead of capacitance sensing circuit 132'. If load cells 50 are included they are preferably connected with decision making center 46. It will be appreciated as the description proceeds that the invention may be implemented in different embodiments.

Continuing with reference to FIGS. 6 and 7, capacitor electrode 122 comprises electrically conducting areas 122*a* and 122*b* preferably unitary with conductor 134. Capacitor electrode 124 comprises electrically conducting areas 124*a* and 124*b* preferably unitary with conductor 136. Capacitor electrodes 122 and 124 are adapted to be located on the surface of the foam cushion of the passenger seat of a vehicle where air must flow to prevent moisture accumulation, therefore, capacitor electrodes 122 and 124 are divided into two or more parts to minimize opposition to air flow.

Two plastic films 142, illustrated as transparent, each preferably having electrically conducting layers 122*a*, 122*b*, 124*a*, 124*b*, 134, and 136 thereon, are joined by a process such as heat or ultrasonic welding to form sealed outer enclosure 144 enclosing the electrically conducting areas and capacitance sensing circuit 132' and protecting them against such as spilled fluids. A polyester film is presently believed to be a preferred material for plastic films 142 because it is known to provide a good foundation for vacuum deposited aluminum. A urethane may be selected for plastic films 142 for providing greater flexibility. Other thermoplastic materials may be selected by those skilled in the relevant arts. Enclosure 144 is preferably attached by adhesive or insert molding to the foam of the seat cushion.

In addition to the two transparent plastic films, a third optional layer 140 of a fibrous material such as a woven or unwoven fabric may be provided to improve the bonding between outer enclosure 144 and the foam rubber cushion of the seat. Layer 140 may be any material selected by those adept in the art of seat manufacture that is known to form a good bond to the adhesive if adhesive is used or to the rubberlike foam material of the seat cushion if enclosure 144 is insert molded into the cushion of the seat. Layer 140 may be attached to a plastic film 142 by melting the fibers of layer 140 with heat or a solvent and allowing the film and fabric to cool or dry. Any other processes for making enclosure 144 may be substituted by those skilled in the relevant arts.

Capacitor electrodes 122 and 124 and the plastic films in which they are sealed are divided longitudinally by slits 122*c* and 124*c* respectively to enhance the ability of capacitor electrodes 122 and 124 and the plastic films in which they are sealed to flex when weight is applied to the seat and to allow air to pass more freely into and out of the foam of the seat cushion. All of the electrical conductors are preferably formed by vacuum depositing a metal such as aluminum onto plastic films 142. Other processes for forming a metallic layer such as screening may be selected by those skilled in the relevant arts.

Furrows are formed in outer enclosure 144 by heat setting or another process known to be suitable by those skilled in the relevant arts to provide sufficient longitudinal elasticity to enable outer enclosure 144 to stretch with the surface of the foam of the seat cushion. Openings 162 and 164 may be provided to enable passage of parts of a seat upholstery tie-down (not illustrated) prior to insert molding outer enclosure 144 and a seat upholstery tie-down into a foam seat cushion.

Straps 122R, 122S, 124R, and 124S may be provided to assist in keeping sealed outer enclosure 144 and the foam of the seat cushion in their intended positions relative to each other and the seat. The straps are preferably unitary with outer enclosure 144 and extend in the forward and rearward directions to attachments (not illustrated) to the seat frame or other suitable elements of the seat.

Capacitance sensing circuit 132' is mounted on printed circuit board 152. Other electronic components (not shown) may also be installed on printed circuit board 152. Printed circuit board 152 includes pads 154 and 156 for making electrical contact with conductors 134 and 136 respectively. Pads 154 and 156 are connected with capacitance sensing circuit 132' by traces 154' and 156' respectively located on printed circuit board 152. Other known ways of affixing and connecting the aforementioned electronic components and electrically connecting those components with capacitor electrodes 122 and 124 may be substituted by those skilled in the relevant arts.

Capacitance sensing circuit 132 may be any capacitance sensor selected by those skilled in the relevant arts from the many commercially available integrated circuits for sensing capacitance that is responsive to the range of capacitances that occur when the seat is occupied by the anticipated occupants and is otherwise suitable. Alternately, a custom designed circuit may be selected. In one seat in which the capacitor electrodes were not longitudinally slit and were about 50 millimeters wide and were separated by about 40 millimeters the capacitance was about 15 picofarads when the seat was occupied by a child in a child seat and 40 or more picofarads when the seat was occupied by a sitting human. For this exemplary seat, capacitance sensing circuit 132' might be selected from those known designs or known commercially available capacitance sensing circuits that are suitable for measuring capacitances in the range of about 10 to about 500 picofarads.

Electrical conductors 38 exit outer enclosure 144 at exit 38', which is sealed by such as melting the insulation of electrical conductors 38 or a hot melt sealant located between the insulation of electrical conductors 38 and the plastic films 142. Other sealing methods and materials for sealing exit 38' of electrical conductors may be substituted by those skilled in the relevant arts.

The designs, materials and methods referred to hereinabove are only suggestions and other materials and methods may be selected by those skilled in the relevant arts.

The operation of an embodiment of the seat occupant presence and position sensing system 10' that incorporates capacitive occupant sensor 10" of the invention will now be described with reference to FIGS. 5 through 7. In operation of the system, the capacitance sensing circuit 132' measures the capacitance between capacitor electrodes 122 and 124 continuously or repeatedly at a repetition rate such as ten measurements per second or other repetition rate found to be suitable by those skilled in the relevant arts and transmits either the capacitance measurement or a categorization based on the capacitance measurement through electrical conductors 38 to decision making circuit 46.

Capacitance sensing circuit 132' may determine from capacitance measurements that the seat contains a normally seated person. In that case the decision making center 46 of the vehicle occupant protection system would deploy an airbag during a crash if the crash justifies an airbag. Alternately, capacitance sensing circuit 132' may determine from the capacitance measurements that the seat contains an infant in an infant seat or a child in a child seat, or another object, or is empty. In those cases the decision making center 46 of the vehicle occupant protection system would not deploy an airbag regardless of the crash. In this embodiment, capacitance sensing circuit 132' communicates its classification of the seat occupant though conductor 38 to decision making center 46 to enable it to consider the classification when deciding whether or not to deploy an airbag.

Instead of classifying the occupant, another embodiment of electronic circuit 132' repeatedly or continuously transmit capacitance measurements though conductor 38 to decision making center 46. Decision making center 46 may determine from the capacitance measurements that the seat contains a normally seated person. In that case it would deploy an airbag during a crash if the crash justifies an airbag. Alternately, decision making center 46 may determine from the capacitance measurements that the seat contains an infant in an infant seat or a child in a child seat, or another object, or is empty. In those cases the decision making center 46 would not deploy an airbag regardless of the crash.

A process for classifying the seat occupant that is inexpensive to implement comprises capacitance sensing circuit 132' or decision making center 46 ascertaining if the capacitance measured between capacitor electrodes 122 and 124 is above or below a predetermined value of capacitance such that an adult human would not cause a lower capacitance.

If the capacitance is above the predetermined value capacitance sensing circuit 132' may provide an electric signal through electrical conductor 38 to decision making center 46 indicating that there is a human sitting in the seat. Alternately, capacitance sensing circuit 132' may provide the actual capacitance measurement through electrical conductor 38 to decision making center 46. In either case, decision making center 46 deploys an airbag during a crash if the crash warrants an airbag.

Continuing to describe the process of classifying the seat occupant that is inexpensive to implement, if the capacitance measured between capacitor electrodes 122 and 124 is less than the previously mentioned predetermined value, capacitance sensing circuit 132' may provides an electric signal through electrical conductor 38 to decision making center 46 indicating that there is not a human sitting in the seat. Alternately, capacitance sensing circuit 132' may provide the actual capacitance measurement through electrical conductor 38 to decision making center 46. In either case, the decision making center 46 does not deploy an airbag during a crash.

It may be desired to distinguish a child in a child seat from an empty seat. For this purpose, if the capacitance measured between capacitor electrodes 122 and 124 is below a second predetermined value that is lower than the capacitance measured when the seat is occupied by an infant or child in an infant or child seat the decision making center 46 of the vehicle occupant protection system takes whatever action is specified for the case of an empty seat. This might be informing the driver the passenger seat is empty to inform the driver the system is working.

The aforementioned process for classifying the seat occupant that is inexpensive to implement comprises the seat occupant presence and position sensing system 10' with an embodiment of capacitive occupant sensor 10" in which Q is not measured, only the capacitance between capacitor electrodes 122 and 124 is measured by electronic circuit 132'. From only the capacitance measurement a person sitting in the seat is distinguished from an infant or a child in an infant or child seat. This is useful because it provides the information required about a passenger seat occupant when the airbag is a low risk deployment airbag. The decision making center 46 considers this information when deciding if an air bag should be deployed.

In a variation of the aforementioned simplified process for classifying the seat occupant that is inexpensive, the capacitance sensing circuit 132' transmits each measurement of capacitance through conductor 38 to the decision making center 46 of the vehicle occupant protection system. The decision making center 46 saves a predetermined number of measurements and considers the current and the saved capacitance values when it classifies the seat occupant. For example, when a crash warrants deploying an airbag, if the capacitance measurements prior to the current measurement indicated a human was seated in the seat but the most recent capacitance measurement did not indicate a human was seated in the seat, the decision making center 46 would deploy the airbag because the seat occupant would be presumed to continue to be a human.

In yet another variation of the aforementioned simplified embodiment of the invention illustrated by FIGS. 5 through 7, capacitance sensing circuit 132' includes a microprocessor that interprets the capacitance measurements and supplies classifications to the decision making center 46 of the vehicle occupant protection system. For this purpose, the microprocessor stores a predetermined number of capacitance measurements. Each time a measurement is made the classification process described hereinabove is performed by the microprocessor and an indication of the classification is transmitted to decision making center 46 through electrical conductors 38.

Embodiments of the invention illustrated by FIGS. 5 through 7 that include seat position sensor 42 and distance sensor 52 provide information for locating the occupant relative to the interior of the vehicle during a crash. For this purpose, distance sensor 52 informs decision making center 46 of the distance from the seat back to the occupant's back at a repetition rate such as 100 times per second. At those times the microprocessor of decision making center 46 uses the distance measurement to compute the positions of parts of the occupant such as the head and the chest relative to the structure of the vehicle based upon the distance from the back of the seat to the back of the person, the position of the seat provided by seat position sensor 42, and average dimensions of the seat occupant. If load cells 50 are included, average dimensions for a person having the occupant's weight are used. If the future position of the occupant is needed, the microprocessor in the decision making center 46 may also estimate the velocity of the seat occupant relative to the vehicle by computing the difference between the current position of the seat occupant and the previous position of the seat occupant and dividing the difference by the time interval between measurements.

In many crashes, decision making center 46 would need to initiate airbag deployment about forty milliseconds before the seat occupant moves forward four inches from the position occupied prior to the crash, which would make knowledge of the position of the occupant of little value in that crash.

However, braking prior to the crash or other factors may cause the occupant to be out of the normal seated position and moving forward when decision making center 46 determines it should initiate airbag deployment. For example, crashes sometimes include multiple collisions in which the first collision does not warrant airbag deployment but a later collision does warrant airbag deployment. In such circumstances knowledge of the position and forward velocity of the seat occupant relative to the vehicle may be useful.

Consider now a first example of using seat position sensor 42 in the embodiments of the invention illustrated by FIGS. 5 through 7. If the distance from the back of the seat to the back of the person is zero (a normally seated person) the torso might be assumed to be an average torso having its front surface offset from the surface of the back of the seat by the thickness of an average torso and approximately parallel with the back of the seat, and the location of the head would then be calculated to be above the torso. If the seat is equipped for occupant weight sensing by such as load cells 50 then the thickness of the torso would be based on the occupant's weight instead of being an average of likely torso dimensions.

Consider now a second example of the use of seat position sensor 42 in the embodiments of the invention illustrated by FIGS. 5 through 7 including distance sensor 42 and weight sensors 50 in which distance sensor 52 is located twelve inches above the seat cushion, the chest of an average seat occupant of the measured weight measures ten inches from back to front, and distance sensor 52 measures the distance from the seat back to the back of the seat occupant to be four inches (which might happen if the occupant is leaning forward), then the front surface of the torso would be calculated to be at a plane located about ten inches offset from a plane beginning at the meeting of the seat cushion and the seat back and rising at an angle that places the surface of the plane four inches from the surface of the seat back at the height of distance sensor 52.

In the aforementioned second example, the occupant may not be leaning forward, rather a crash may have just occurred and the entire occupant may be moving forward relative to the seat and a different interpretation is required. The entire occupant would be moving forward and the most recent reading from distance sensor 52 would be interpreted to place the occupant's back four inches from the back of the seat and the front of the occupant's torso would be offset fourteen inches (the chest thickness plus the offset of the occupant's back from the seat back) from the surface of the seat back. The decision making center 46 is enabled to choose the correct interpretation because its accelerometer indicates a crash is occurring.

Distance sensor 52 provides distance measurements repeatedly at a repetition rate such as 100 times per second. Distance sensor 52 is preferably a radar or ultrasonic distance sensor. Such sensors operate as intended during most circumstances but they may be disabled by something covering sensor 52 such as a coat draped over the seat back. Distance measured by sensor 52 may be used to confirm occupant positions determined by integrating the deceleration of a crash. If the airbag is a dual stage airbag, distance measured by sensor 52 may be a factor considered by decision making center when deciding whether or not to deploy an airbag to its higher force levels.

Continuing with the foregoing alternate to the aforementioned second example, in which the forward position of the occupant is the result of movement caused by the deceleration of a crash; and add the assumption that 0.01 seconds before the occupant's back was 4.0 inches from the seat back the distance from the back of the seat to the back of the seat occupant was measured to be 3.1 inches. From these two measurements it can be calculated that the occupant was moving forward relative to the vehicle at an average speed of 90 inches per second during the most recent 0.01 second interval.

Distance measured by sensor 52 may be used to confirm occupant positions determined as described above by integrating the deceleration of a crash. If the airbag is a dual stage airbag and if distance sensor 52 indicates there is a large distance between the back of the seat and the back of the seat occupant the large distance may be a reason to not deploy an airbag to its higher force levels because the higher force levels might injure the occupant. Alternately, for a different airbag the large distance might indicate that higher force levels are required to protect the occupant because of the close proximity to the dashboard.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A protection system in a vehicle comprising:
   at least one sensor responsive to distance from a location on a seat to a location on an occupant to produce a signal classifying an occupant of the seat into one of at least two categories; and
   a processor for receiving the signal and controlling the protection system based on the signal.

2. The protection system of claim 1, wherein the two categories comprise categories associated with a position of the occupant in the seat.

3. The protection system of claim 1, wherein the two categories comprise the occupant in a normally seated position and the occupant leaning forward.

4. The protection system of claim 3, wherein the occupant leaning forward is associated with the occupant leaning 6 to 11 inches forward from the normally seated position.

5. The protection system of claim 1, wherein the two categories comprises the occupant as a person in a normally seated position and the occupant as an object other than a person.

6. The protection system of claim 1, wherein the processor saves a predetermined number of the received signals and determines if an airbag should be deployed based on the signal and the number of the received signals.

7. The protection system of claim 1, further comprising at least one sensor for determining whether the occupant is a person or an infant car seat.

8. The protection system of claim 1, further comprising at least one sensor for determining whether the seat is occupied or vacant.

9. The protection system of claim 1, wherein the processor further computes positions of parts of the occupant relative to a structure of the vehicle.

10. The protection system of claim 9, wherein the parts are a head and a chest of the occupant.

11. The protection system of claim 1, wherein the processor further estimates a velocity of one or more parts of the occupant relative to the vehicle.

12. The protection system of claim 1, wherein the two categories comprise categories associated with the occupant of the seat.

13. The protection system of claim 1, wherein the two categories comprise an adult occupant or a child occupant.

14. The protection system of claim 1, wherein the at least one sensor is a capacitive sensor.

15. The protection system of claim 1, further comprising at least two sensors.

16. The protection system of claim 1, further comprising at least three sensors.

\* \* \* \* \*